(12) United States Patent
Nonaka et al.

(10) Patent No.: US 6,352,753 B2
(45) Date of Patent: *Mar. 5, 2002

(54) OPTICAL RECORDING MEDIUM

(75) Inventors: Toshihisa Nonaka; Kunihisa Nagino; Takeshi Arai; Hideo Nakakuki, all of Shiga (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,059

(22) Filed: Nov. 3, 1999

(30) Foreign Application Priority Data

| Nov. 10, 1998 | (JP) | 10-319212 |
| Jan. 28, 1999 | (JP) | 11-020532 |
| Jan. 28, 1999 | (JP) | 11-020534 |
| Jan. 28, 1999 | (JP) | 11-020535 |
| Apr. 21, 1999 | (JP) | 11-113788 |

(51) Int. Cl.$^7$ ................................................. B32B 3/02
(52) U.S. Cl. .................... 428/64.1; 428/64.4; 428/64.5; 428/64.6; 428/913; 430/270.13; 430/495.1; 430/945; 369/283; 369/288
(58) Field of Search ............................... 428/64.1, 64.2, 428/64.4, 64.5, 64.6, 457, 913; 430/270.13, 495.1, 945; 369/283, 288

(56) References Cited

U.S. PATENT DOCUMENTS 5,294,523 A   3/1994 Nagano et al.
5,688,574 A * 11/1997 Tamura ...................... 428/64.1
5,871,881 A *  2/1999 Nishida ................. 430/270.11
6,086,796 A *  7/2000 Brown ....................... 264/1.33
6,153,063 A * 11/2000 Yamada ................... 20/192.22

FOREIGN PATENT DOCUMENTS

EP   0 825 595 A1    2/1998
EP   0 874 361 A2   10/1998

* cited by examiner

*Primary Examiner*—Elizabeth Evans
(74) *Attorney, Agent, or Firm*—Morrison & Foerster LLP

(57) ABSTRACT

A rewritable phase change type optical recording medium having excellent in storage durability such as archival property and overwrite shelf property and is less likely to have increased jitters, lower contrast and bursting due to deterioration by repeated overwriting is disclosed. The optical recording medium comprises a first dielectric layer, a first boundary layer and a recording layer, in tis order, wherein the first boundary layer is in contact with the recording layer. The information in the optical recording medium can be recorded, erased and reproduced by irradiating the recording layer with light. The recording and erasure of information are affected by reversible phase change between amorphous phase and crystalline phase of the recording layer. The first boundary layer comprises a material comprising an oxide, a carbide, a nitride of one or more elements (excluding carbon) belonging to a group 3A through group 6B of the $2^{nd}$ period through the $6^{th}$ period in the periodic table; carbon; or a compound with carbon and oxygen and/or nitrogen.

20 Claims, 6 Drawing Sheets

OPTICAL RECORDING MEDIUM

BACKGROUND OF THE INVENTION

The present invention relates to an optical information recording medium which allows information to be recorded, erased and reproduced by irradiation with light. Particularly, the present invention relates to a rewritable phase change type optical recording medium such as an optical disc, optical card or optical tape, which allows recorded information to be erased and rewritten and can record information signals at a high speed and a high density.

The conventional rewritable phase change type optical recording medium technology is described below. The conventional optical recording media have a recording layer mainly composed of tellurium, etc., and for recording, the recording layer in the crystalline state is irradiated with focused laser beam pulses for a short time, to be partially molten. The molten portions are quickly cooled and solidified by thermal diffusion, to form recorded marks of the amorphous state. The light reflectance of the recorded marks is lower than that of the crystalline state, and they can be optically reproduced as recorded signals. For erasing, the recorded marks are irradiated with a laser beam, to be heated to a temperature lower than the melting point and higher than the crystallization point of the recording layer, to crystallize the amorphous recorded marks, for restoring the original non-recorded state.

Known materials used as the recording layers of these rewritable phase change type optical recording media include alloys such as $Ge_2Sb_2Te_5$ (N. Yamada et al., Proc. Int. Symp. on Optical Memory, 1987, p. 61–66). The optical media using these Te alloys in their recording layers have a high crystallization rate and allow high speed overwriting by one circular beam simply by modulating the irradiation power.

An optical recording medium using such a recording layer, for example, has a four-layer structure consisting of a first dielectric layer, a recording layer, a second dielectric layer and a metallic reflection layer provided in this order on a transparent substrate obtained by molding a polycarbonate resin. The dielectric layers act to prevent the recording layer form being deformed or opened during recording. Furthermore, the reflection layer acts to improve the signal contrast during reproduction by its optical interference effect.

Known materials used as the dielectric layers in contact with the recording layer include sulfides such as ZnS (Nishiuchi et al., Proceedings of 35th Joint Lecture Meeting of Physics, 28P-ZQ-3, P. 842 (1988)) and a mixture film of ZnS and $SiO_2$ as a less internally stressed material (Toshimitsu Kurumizawa et al., 35th Joint Lecture Meeting of Physics, 28P-ZQ-3, P. 839 (1988)).

The above mentioned conventional rewritable phase change type optical recording media have the following problems.

If a layer containing a sulfide such as ZnS is used as a layer in contact with a recording layer, there arise such problems that since the erasability of the recording layer declines, it becomes difficult to secure sufficient erasability under recording conditions high linear speed and high density, and that the decreaseage of signal amplitude and the decline of erasability occur during repeated recording to increase the jitters of reproduced signals.

Furthermore, the conventional constitution has the following problems. First of all, if a recorded recording medium is allowed to stand for a long time (hereinafter called the archival property), it can happen that recorded marks vanish, and that the dielectric layers are separated from the recording layer, to cause bursting. Furthermore, if a optical recording medium which has signals recorded and has been allowed to stand for a long time has signals overwritten on a track having signals recorded (hereinafter called the overwrite shelf property), the jitters maybe increased to cause an error disadvantageously. So, the optical recording medium has a problem in storage durability.

For example, International Publication WO 96/17344 discloses a structure in which carbon is disposed to contact a recording layer. In more detail, the second dielectric layer contains carbon or a mixture with a metal or semimetal added to carbon. In this case, It is Intended to lessen the variations in the size of recorded marks by keeping the photoabsorption of the recording layer in the crystalline state larger than that in the amorphous state. However, this structure has a problem that it is insufficient in the above repetitive overwritability and storage durability.

Japanese Patent Laid-Open (Kokai) No. Hei3-100936 describes an optical recording medium having a substrate, a dielectric layer, a recording layer, a carbon layer and a dielectric layer laminated in this order. It is stated that the disc can be made higher in sensitivity since the carbon layer can absorb light. However, this structure has a disadvantage that the above problems of repetitive overwritability and storage durability cannot be solved.

Japanese Patent Laid-Open (Kokai) No. Hei2-139283 discloses an optical recording medium consisting of a substrate, a transparent layer (ZnS or ZnS-C), a carbon layer (10 nm or less), a recording layer ($Ge_2Sb_2Te_5$), a carbon layer (10 nm or less) and a reflection layer. However, this structure has a disadvantage that the repetitive overwritability and the storage durability are insufficient in the case of high density edge recording.

An object of the present invention is to provide a rewritable phase change type optical recording medium less likely to have increased jitters, lower contrast, bursting, etc. respectively caused as deterioration by repeated overwriting. Another object of the present invention is to provide a rewritable phase change type recording medium excellent in storage durability such as archival property and overwrite shelf property.

SUMMARY OF THE INVENTION

The objects of the present invention can be achieved by an optical recording medium, which comprises at least a first dielectric layer, a first boundary layer In contact with a recording layer, and the recording layer laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer is mainly composed of at least one selected from (1) oxides of elements (excluding carbon) belonging to group 3A through group 6B of the 2nd period through the 6th period In the periodic table,
(2) carbides of elements (excluding carbon) belonging to group 3A through group 6B of the 2nd to the 6th period In the periodic table,
(3) nitrides of elements (excluding carbon) belonging to group 3A through group 6B of the 2nd period through the 6th period In the periodic table, and (4) carbon or compounds with carbon and oxygen and/or nitrogen, and said recording layer comprises the composition represented by the following formula (I):

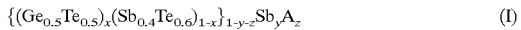

$$\{(Ge_{0.5}Te_{0.5})_x(Sb_{0.4}Te_{0.6})_{1-x}\}_{1-y-z}Sb_yA_z \quad (I)$$

(where A represents one selected from the elements belonging to group 3A through group 6B of the 2nd period through the 6th period in the periodic table, excluding Ge, Sb and Te, and x, y and z satisfy the following relations:

$0.2 \leq x \leq 0.8$, $0.01 \leq y \leq 0.08$, $z=0$, or
$0.2 \leq x \leq 0.8$, $0 \leq y \leq 0.08$, $0 < z \leq 0.2$)

Furthermore, the objects of the present invention can also be achieved by an optical recording medium, which comprises at least a first dielectric layer, a first boundary layer in contact with a recording layer, the recording layer, and a second boundary layer in contact with the recording layer, laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer and said second boundary layer are mainly composed of at least one selected from
(1) oxides of elements (excluding carbon) belonging to group 3A through group 6B of the 2nd period through the 6th period in the periodic table,
(2) carbides of elements (excluding carbon) belonging to group 3A through group 6B of the 2nd to the 6th period in the periodic table,
(3) nitrides of elements (excluding carbon) belonging to group 3A through group 6B of the 2nd period through the 6th period in the periodic table, and
(4) carbon or compounds with carbon and oxygen and/or nitrogen, and said recording layer comprises the composition represented by the following formula (II):

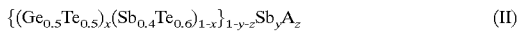

$$\{(Ge_{0.5}Te_{0.5})_x(Sb_{0.4}Te_{0.6})_{1-x}\}_{1-y-z}Sb_yA_z \quad (II)$$

(where A represents one selected from the elements belonging to group 3A through group 6B of the 2nd period through the 6th period in the periodic table, excluding Ge, Sb and Te, and x, y and z satisfy the following relations:

$0.2 \leq x \leq 0.95$, $0.01 \leq y \leq 0.08$, $z=0$, or
$0.2 \leq x \leq 0.95$, $0 \leq y \leq 0.08$, $0 < z \leq 0.2$)

DESIRABLE EMBODIMENTS

Figure 1:
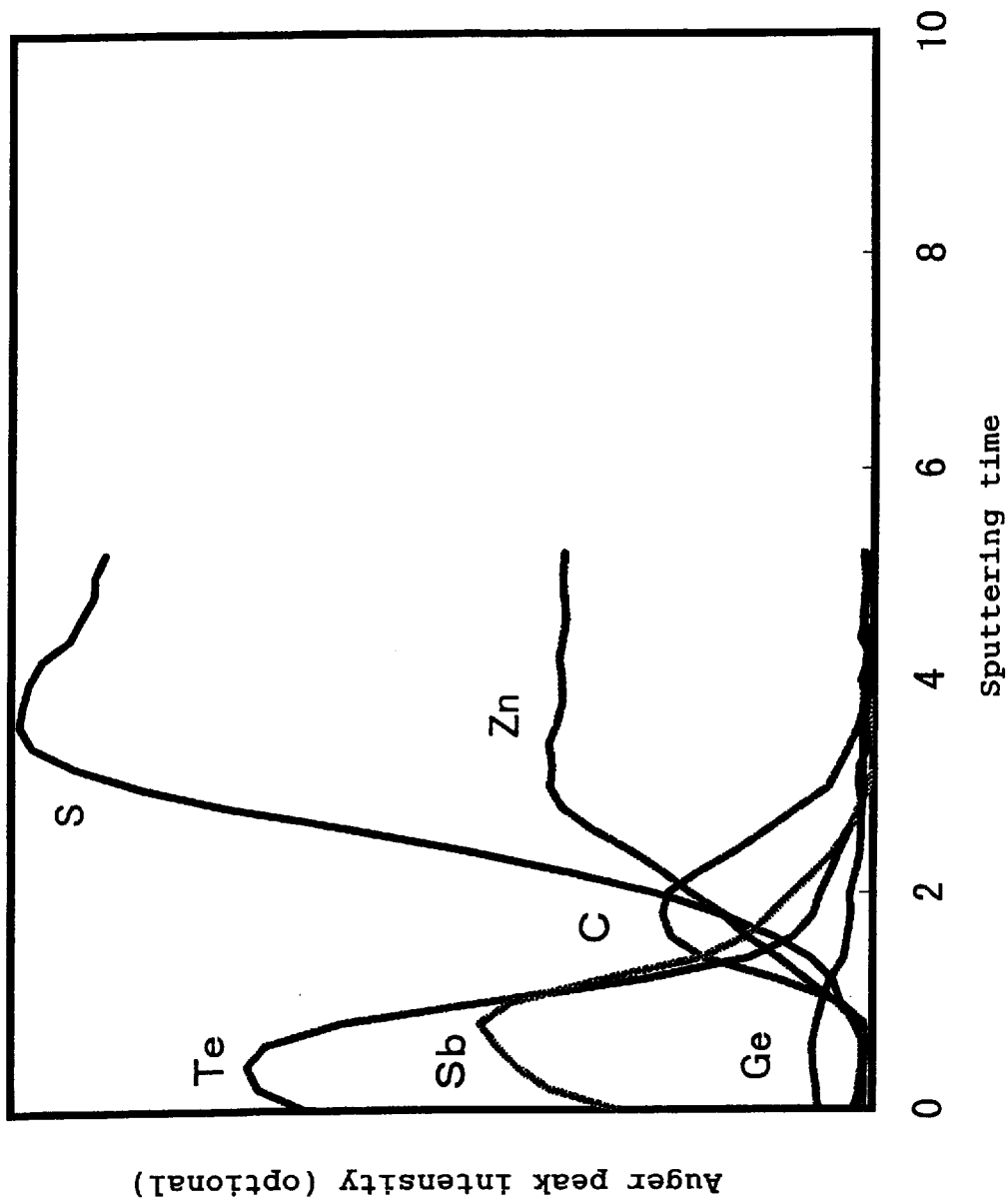
FIG. 1 is a depth profile of sample A (Ge-Sb-Te (recording layer: 7 nm)/C (first boundary layer: 2 nm)/ZnS-SiO₂ (first protective layer: 93 nm)/substrate) obtained by Auger electron spectroscopy.

The cause of the jitters increase and the contrast decline occurring as deterioration due to repeated overwriting, intended to be overcome by the present invention, is considered to be that the component materials of the first dielectric layer bleed out into the recording layer due to repeated overwriting. Furthermore, the direct cause in the increase of the jitters by the overwrite shelf property is that erasability declines. The reasons why the erasability declines are considered to be that while the recorded marks (amorphous phase) are allowed to stand for a long time, states such as atomic arrangement change, or that the dielectric layer and the recording layer react with each other.

The inventors studied intensively, and found that if the following boundary layer is provided between the first dielectric layer and the recording layer, the deterioration due to repeated overwriting can be improved, and furthermore that the jitters increase due to the overwrite shelf property can be improved.

It is preferable that the present invention is applied to an optical recording medium used for mark length recording at the shortest mark length of 0.7 μm or less and at a linear speed of 5 m/s or more. In recording at such a high density and a high linear speed, the jitters increase and the contrast decline very gravely and adversely affect the recording properties of the optical recording medium. So, the improving effects of the present invention are significant.

A typical layer composition of the optical recording medium of the present invention is, for example, a first dielectric layer, a first boundary layer, a recording layer, a second dielectric layer and a reflection layer laminated in this order on a transparent substrate, but the layer structure is not limited to it.

The respective layers of the optical recording medium of the present invention are described below.

A material suitable for the first dielectric layer is a mixture consisting of ZnS and SiO₂. Since this material is small in the residual stress, bursting is unlikely to be caused by repeated overwriting. A mixture consisting of ZnS, SiO₂ and carbon is especially preferable since the residual stress of the layer is further smaller and since the recording sensitivity, carrier-to-noise ratio (C/N) and erasure rate are not deteriorated even by repeating recording and erasure. The thickness of the first dielectric layer is decided in relation with optical conditions, and it is preferable that the thickness is 5 to 500 nm. If the thickness is larger than the range, cracking is likely to occur, and if smaller, the substrate is likely to be thermally damaged by repeated overwriting, to lower repeatability. It is especially preferable that the thickness of the first dielectric layer is 10 nm to 200 nm.

In the present invention, it is necessary to form a boundary layer between said first dielectric layer and the recording layer. This boundary layer is called the first boundary layer. The first boundary layer is formed in contact with the recording layer. Furthermore, in the present invention, it is preferable to form another boundary layer in contact with the recording layer on the side opposite to the first boundary layer. The other boundary layer is called the second boundary layer.

The first boundary layer and the second boundary layer of the present invention are mainly composed at least one selected from
(1) oxides of elements (excluding carbon) belonging to group 3A through group 6B of the 2nd period through the 6th period in the periodic table,
(2) carbides of elements (excluding carbon) belonging to group 3A through group 6B of the 2nd to the 6th period in the periodic table,
(3) nitrides of elements (excluding carbon) belonging to group 3A through group 6B of the 2nd period through the 6th period in the periodic table, and
(4) carbon or compounds with carbon and oxygen and/or nitrogen. That the layers are mainly composed of at least one means that the layers contain at least 50 mol % or more, preferably 60 mol % or more of the selected one in the entire composition.

The elements (excluding carbon) belonging to group 3A through group 6B of the 2nd period through the 6th period in the present invention can be at least one selected from B, Al, Si, Sc, Ti, V, Cr, Mn, Fe, Co, Ni, Cu, Zn, Ga, Ge, Y, Zr, Nb, Mo, Ru, Rh, Pd, Ag, Cd, In, Sn, La, Hf, Ta, W, Re, Ir, Tl and Pb.

The first and second boundary layers can be composed of the same material or respectively different materials.

The first boundary layer can prevent the jitters increase and the reproduced signal amplitude decrease caused by repeated overwriting. The reason is considered to be that the first boundary layer acts as a barrier layer for preventing the diffusion of the components of the first dielectric layer into the recording layer. Furthermore, the jitters increase by the overwrite shelf property can be improved. The reason is estimated to be that the change of states such as atomic arrangement in the recording layer and the reaction between the dielectric layer and the recording layer can be prevented even if the optical recording medium is allowed to stand for a long time. Furthermore, if the second boundary layer is provided, the above effects can be further improved.

It is preferable that the oxygen content, carbon content or nitrogen content of the boundary layers of the present invention is less than the stoichiometric ratio since the interlayer separation at the interfaces between the boundary layers and the recording layer is less likely to occur because of higher adhesive strength.

It is preferable to raise the concentrations of the elements belonging to group 3A through group 6B of the 2nd period through the 6th period in the boundary layers, because of the effect of intensifying the bonding between the boundary layers and the recording layer and the effect of enhancing the crystallization rate of the recording layer. On the other hand, in view of the thermal and chemical stability of the boundary layers, it is preferable that the layers contain much oxygen, carbon or nitrogen.

So, as for the concentration distribution of elements in the normal direction of a boundary layer, it is preferable that the concentration of elements belonging to group 3A through group 6B of the 2nd period through the 6th period is kept high, i.e., the concentration of oxygen, carbon or nitrogen is kept low on the side in contact with the recording layer, and that the concentration of elements belonging to group 3A through group 6B of the 2nd period through the 6th period is kept low, i.e., the concentration of oxygen, carbon or nitrogen is kept high on the side opposite to the recording layer, since the concentration distribution is effective for satisfying both the high adhesiveness between the recording layer and the boundary layer and the high thermal and chemical stability of the film.

It is preferable that the material of the first and second boundary layers is the oxide, carbide or nitride of an element selected from aluminum, silicon, titanium, chromium, germanium and zirconium, or carbon, because of excellent erasability and unlikelihood of causing interlayer separation during long-term storage. It is especially preferable to select the material from the aluminum oxide represented by the following formula (III), the silicon carbide represented by the following formula (VI), the titanium nitride represented by the following formula (V), the chromium nitride represented by the following formula (VI), the germanium nitride represented by the following formula (VII) and carbon.

$$Al_2O_{3-p} \qquad (III)$$

$(0<p\leq2.0)$

If p=0, the adhesiveness between the boundary layer and the recording layer is insufficient, and interlayer separation and bursting may occur during long-term storage and repeated recording unpreferably. If p>2.0, since the boundary layer and the recording layer are likely to react with each other, the decline of erasability and the decreaseage of signal amplitude are likely to occur and bursting is also likely to occur during repeated recording unpreferably. It is preferable that p is 0.05 to less than 1.8 since bursting is very unlikely to occur.

$$SiC_q \qquad (IV)$$

$(0.3<q<1)$

If $q\geq1$, the adhesiveness between the boundary layer and the recording layer is insufficient, and interlayer separation and bursting are likely to occur during long-term storage and repeated recording unpreferably. If q<0.3, since the boundary layer and the recording layer are likely to react with each other, the decline of erasability and the decreaseage of signal amplitude are likely to occur and bursting is also likely to occur during repeated recording unpreferably. It is preferable that q is 0.3 to less than 1 since bursting is very unlikely to occur.

$$TiN_r \qquad (V)$$

$(0.5<r<1)$

If $r\geq1$, the adhesiveness between the boundary layer and the recording layer is insufficient, and interlayer separation and bursting are likely to occur during long-term storage and repeated recording unpreferably. If r<0.5, since the boundary layer and the recording layer are likely to react with each other, the decline of erasability and the decreaseage of signal amplitude are likely to occur and bursting is also likely to occur during repeated recording unpreferably. It is preferable that r is 0.5 to less than 1 since bursting is very unlikely to occur.

$$CrN_s \qquad (VI)$$

$(0.8<s<1)$

If $s\geq1$, the adhesiveness between the boundary layer and the recording layer is insufficient, and interlayer separation and bursting are likely to occur during long-term storage and repeated recording unpreferably. If s<0.8, since the boundary layer and the recording layer are likely to react with each other, the decline of erasability and the decreaseage of signal amplitude are likely to occur and bursting is also likely to occur during repeated recording unpreferably. It is preferable that s is 0.5 to less than 1 since bursting is very unlikely to occur.

$$GeN_t \quad (VII)$$

(0.2<t<1)

If $t \geq 1$, the adhesiveness between the boundary layer and the recording layer is insufficient, and interlayer separation and bursting are likely to occur during long-term storage and repeated recording unpreferably. If t<0.2, since the boundary layer and the recording layer are likely to react with each other, the decline of erasability and the decreaseage of signal amplitude are likely to occur and bursting is also likely to occur during repeated recording unpreferably. It is preferable that t is 0.2 to less than 1 since bursting is very unlikely to occur. Furthermore, if the number of germanium atoms in the first boundary layer is $m_r$, the number of nitrogen atoms in the first boundary layer is $n_r$, the number of germanium atoms in the second boundary layer is m and the number of nitrogen atoms in the second boundary layer is n , then it is preferable to satisfy the following relation: $5 \times m_o/n_o > m_r/n_r > m_o/n_o$. It is preferable in view of unlikelihood to cause separation, that the relation between number of germanium atoms m and the number of nitrogen atoms n is m>n. It is more preferable that the relation is 0.6 m>n since bursting is unlikely to occur during repeated recording. If the relation is 0.01 m>n, overwritability declines unpreferably. Germanium can be partially replaced by another element while equivalent properties are kept, and it is economically advantageous to replace by a less expensive element such as chromium.

Since the recording layer is thin, the physical properties, materials, states, etc. of the layers in contact with the recording layer, i.e., the first and second boundary layers greatly affect the crystallization rate of the recording layer and the storage stability of the chemically metastable amorphous state. The use of a sulfide in the layers in contact with the recording layer is unsuitable for recording at a high linear speed and a high density, since the crystallization rate of the recording layer is lowered. If the first and second boundary layers of the present invention are used in contact with the recording layer, they are suitable for recording at a high linear speed and a high density since the crystallization rate of the recording layer becomes higher. Especially when both the first and second boundary layers are provided, a larger effect can be obtained in enhancing the crystallization rate.

It is preferable in view of unlikelihood to cause separation and for optical conditions, that the thickness of the first boundary layer is 0.5 nm to 10 nm. If the thickness is more than 10 nm, the layer is likely to be separated from the first dielectric layer and the recording layer. If the thickness is less than 0.5 nm, it is difficult to deposit the layer in a uniform thickness by evaporation, and the effect of the first boundary layer may not be obtained.

In view of unlikelihood to cause separation and for optical conditions, it is preferable that the thickness of the second boundary layer is 0.5 nm to 50 nm, though the thickness is not especially limited in this range. If the thickness is more than 50 nm, separation may occur. If the thickness is less than 0.5 nm, it is difficult to deposit the layer in a uniform thickness by evaporation, and the effect of the second boundary layer may not be obtained.

If carbon layers are used as the first and second boundary layers, it is preferable that the thickness is 0.5 nm to 4 nm, in view of carbon film vapor deposition rate and repeatability.

The mechanism in the preferable thickness ranges of the boundary layers is considered to be as described below.

Figure 2:
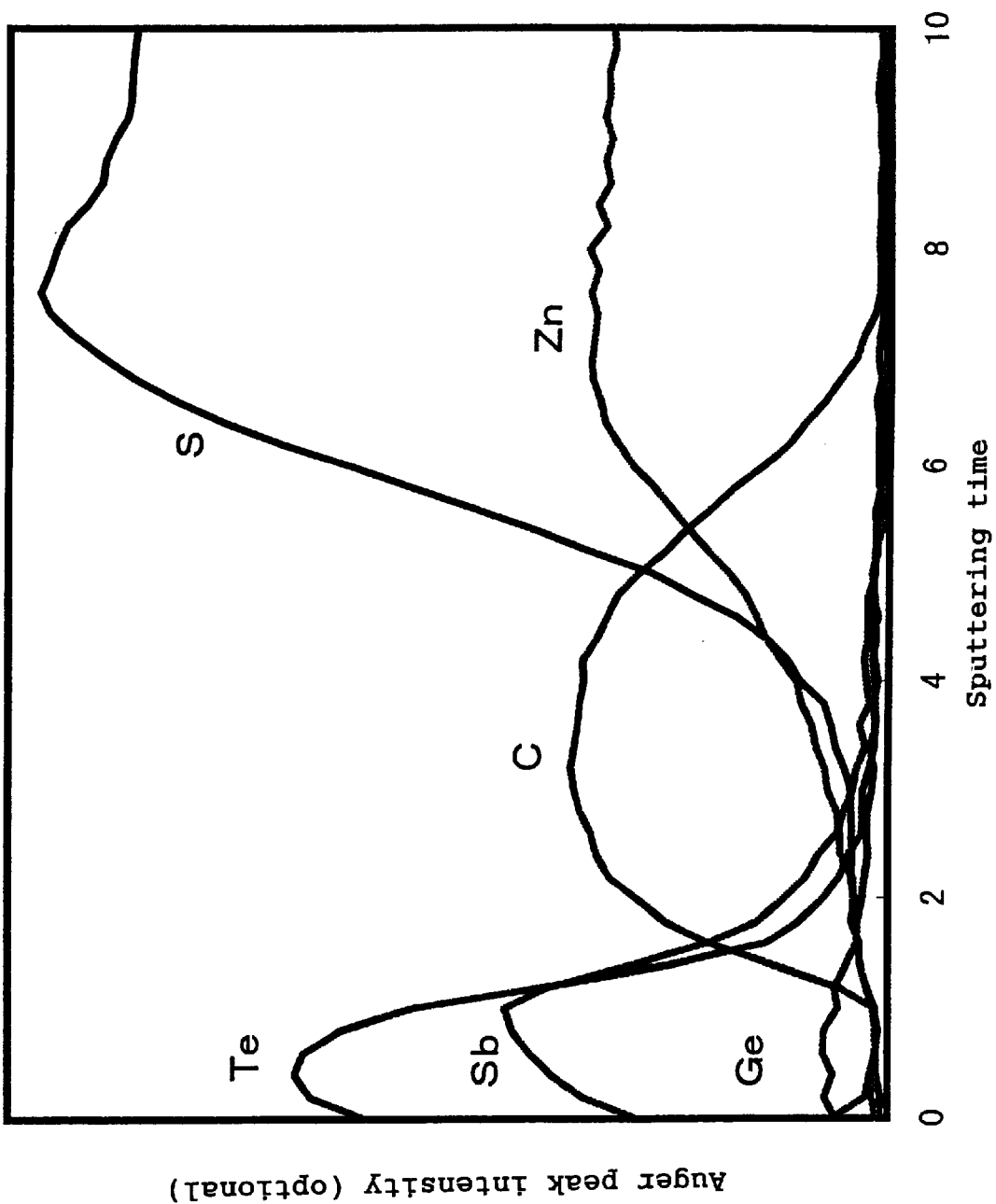
FIG. 2 is a depth profile of sample B (Ge-Sb-Te (recording layer: 7 nm)/C (first boundary layer: 5 nm)/ZnS-SiO₂ (first protective layer: 93 nm)/substrate) obtained by Auger electron spectroscopy.
Figure 3:
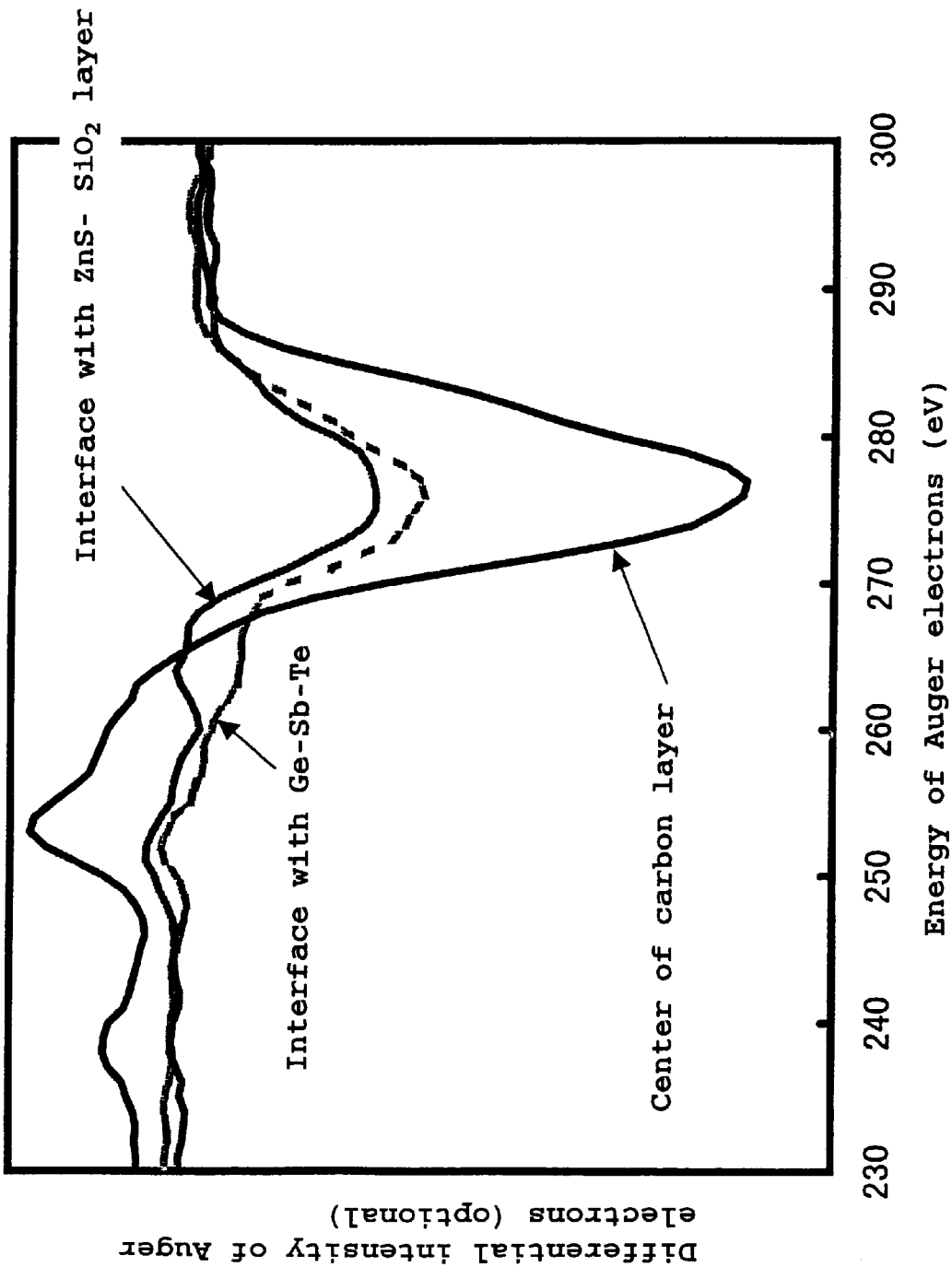
FIG. 3 is a KLL Auger electron spectrum of carbon of sample A.
Figure 4:
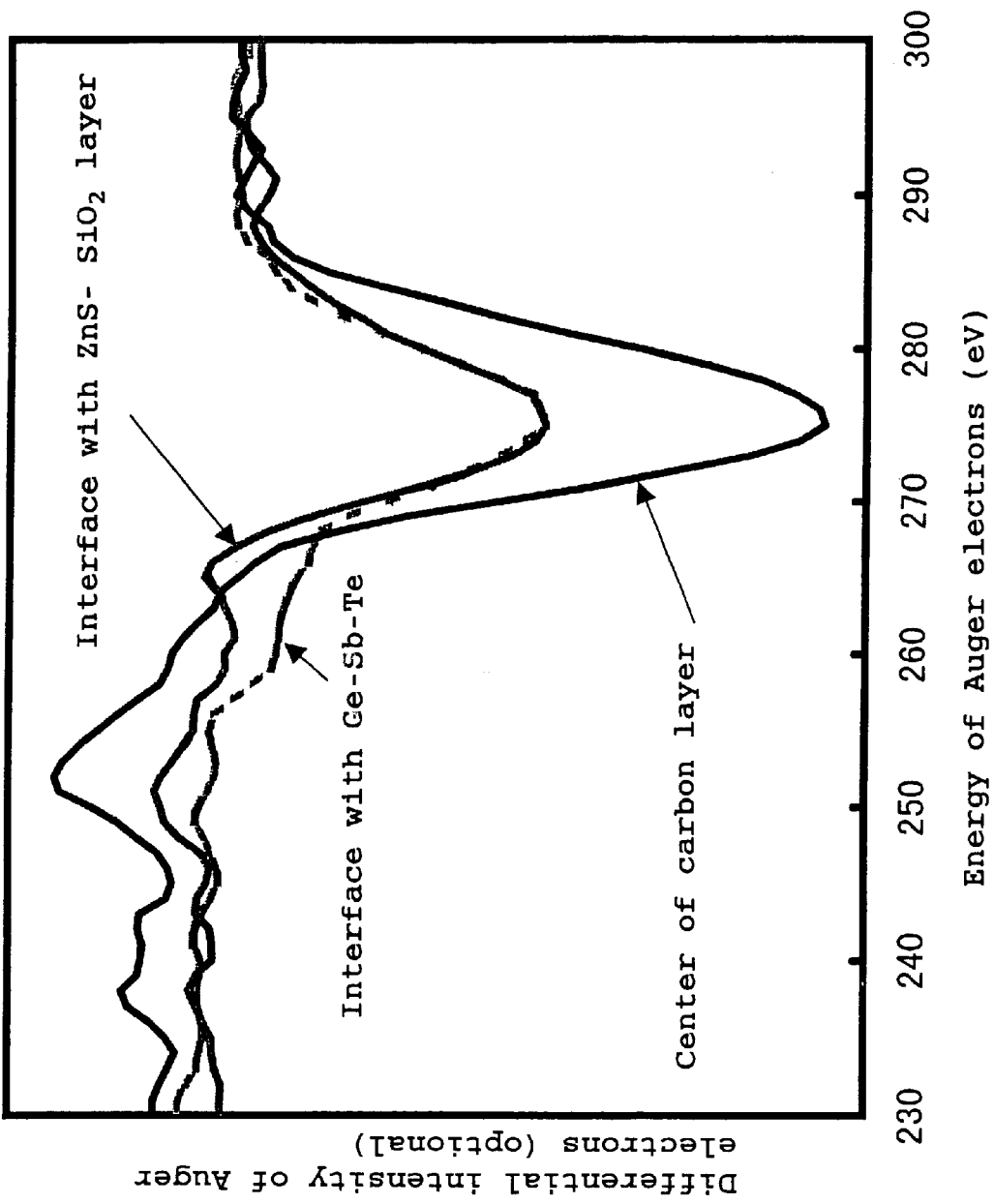
FIG. 4 is a KLL Auger electron spectrum of carbon of sample B.
Figure 5:
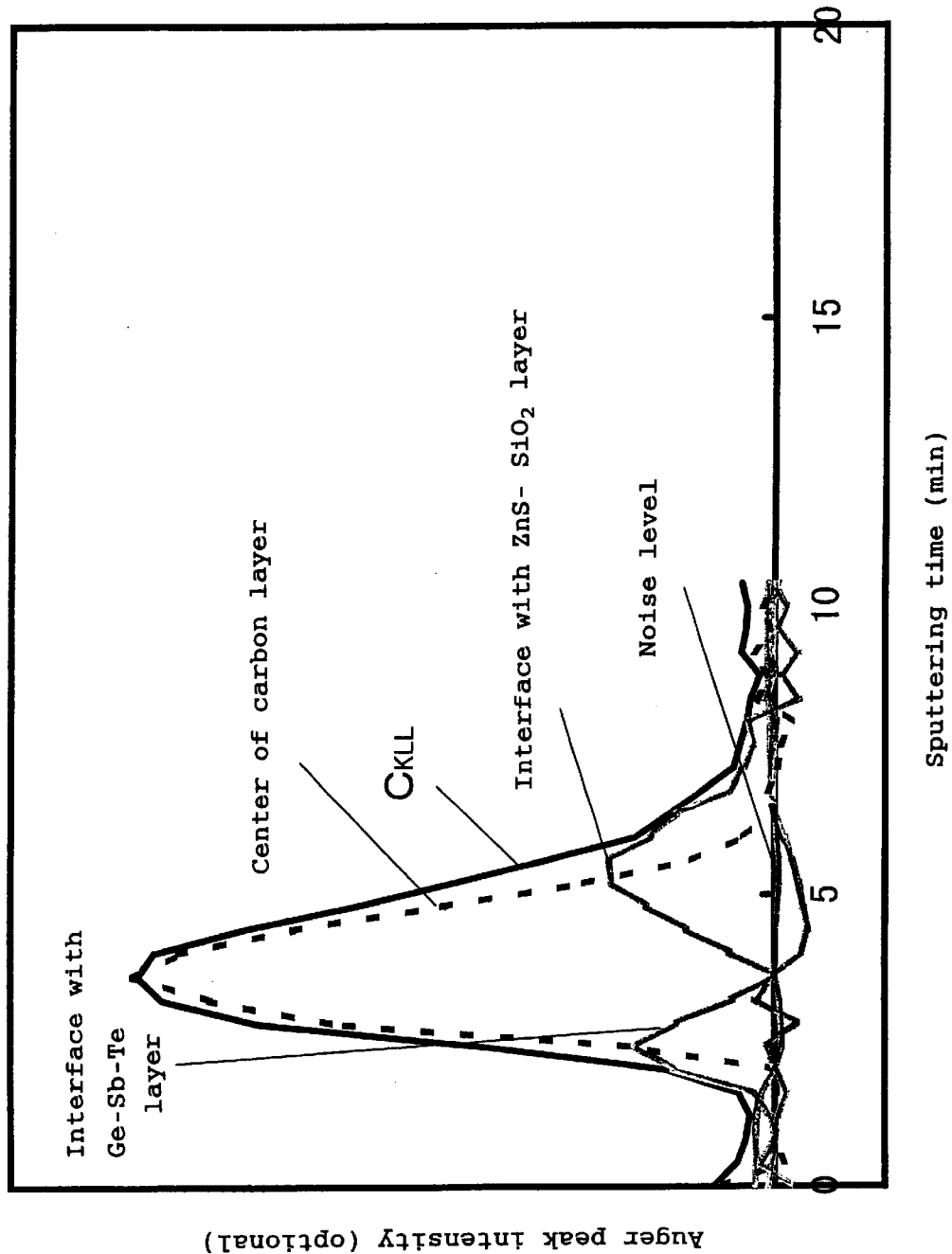
FIG. 5 shows three components obtained by resolving the depth profile spectrum of carbon of FIG. 1; the spectrum from the boundary between the Ge-Sb-Te layer and the carbon layer, the spectrum from the center in the normal direction of the carbon layer, and the spectrum from the boundary between the carbon layer and the ZnS-SiO₂ layer.
Figure 6:
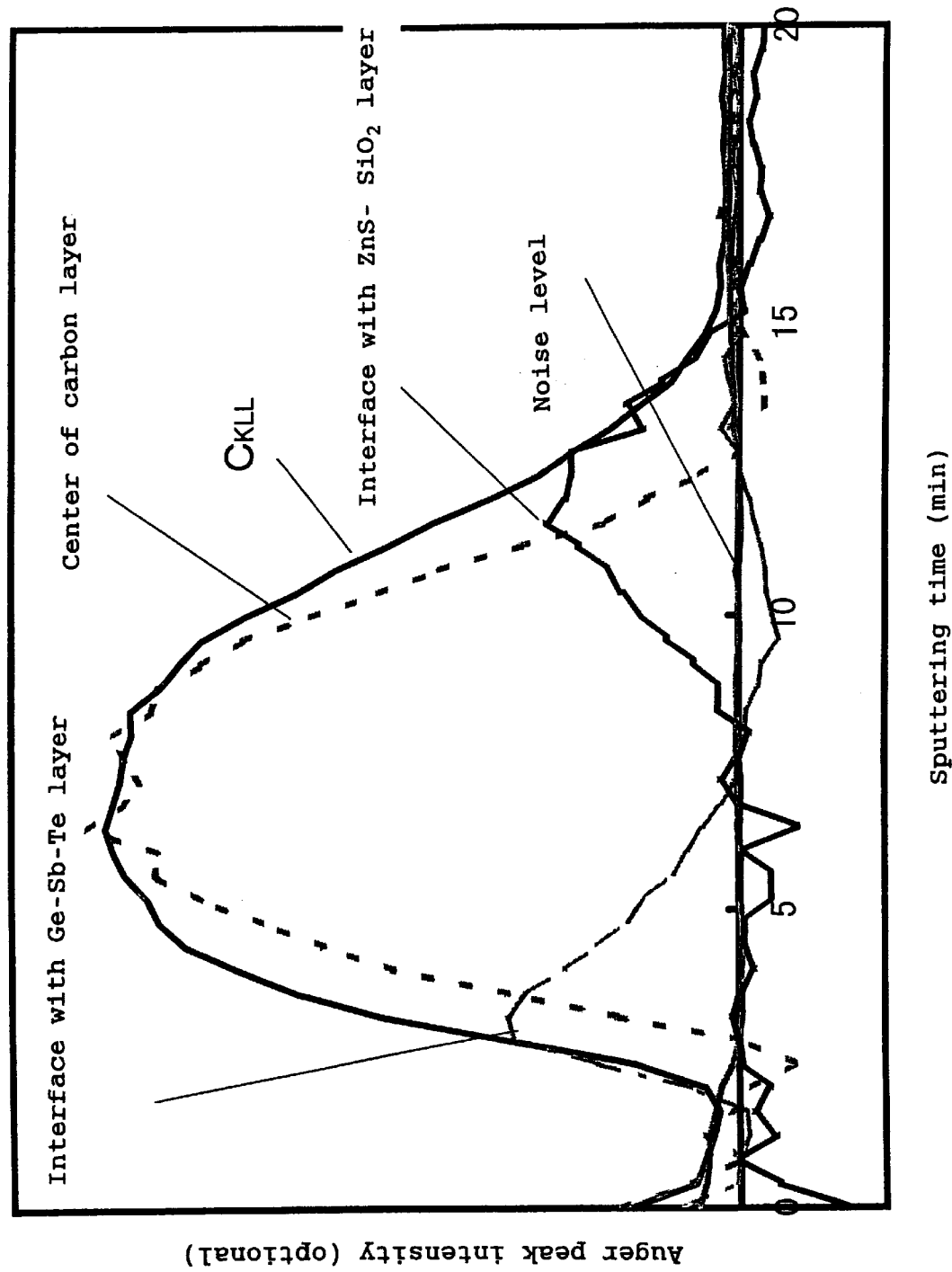
FIG. 6 shows three components obtained by resolving the depth profile spectrum of carbon of FIG. 2: the spectrum from the boundary between the Ge-Sb-Te layer and the carbon layer, the spectrum from the center in the normal direction of the carbon layer, and the spectrum from the boundary between the carbon layer and the ZnS-SiO₂ layer.

FIGS. 1 and 2 are depth profiles of sample A {Ge-Sb-Te (recording layer: 7 nm)/C (first boundary layer: 2 nm)/ZnS-SiO$_2$ (first protective layer: 93 nm)/substrate} (FIG. 1) and sample B (Ge-Sb-Te (recording layer: 7 nm)/C (first boundary layer: 5 nm)/ZnS- SiO$_2$ (first protective layer: 93 nm)/substrate) (FIG. 2) respectively obtained by Auger electron spectroscopy (the instrument used was "PHI-670 produced by Perkin Elmer). The time taken for digging the sample from the surface by irradiating with Ar ions for sputter etching is chosen as the abscissa, and corresponds to the depth from the sample surface, in other words, the thickness of the layer, and the peak intensities of Auger electrons detected from the respective elements are chosen as the ordinate. That is, the ratio of the elements existing at each thickness from the surface is expressed. FIG. 3 shows the KLL Auger electron spectra of carbon of sample A at sputtering times of 1.0 minute, 1.8 minutes and 3.2 minutes respectively corresponding to the boundary between the Ge-Sb-Te layer and the carbon layer, the center in the normal direction of the carbon layer and the boundary between the carbon layer and the ZnS- SiO$_2$ layer. FIG. 4 shows the KLL Auger electron spectra of carbon of sample B at sputtering times of 1.4 minutes, 3.8 minutes and 6.4 minutes respectively corresponding to the boundary between the Ge-Sb-Te layer and the carbon layer, the center in the normal direction of the carbon layer and the boundary between the carbon layer and the ZnS- SiO$_2$ layer. It can be seen that in both FIGS. 3 and 4, the respective three spectra are different in form. The spectra at the centers in the normal direction of the carbon layers in FIGS. 3 and 4 can be identified as those of graphite. The spectra at the boundaries between the carbon layers and the ZnS- SiO$_2$ layers show shoulder peaks attributable to carbide at about 266 eV, and it can be seen that carbon is chemically combined with the ZnS- SiO$_2$ layers. The spectra at the boundaries between the Ge-Sb-Te layers and the carbon layers are intermediate between the spectra at the centers of the carbon layers and the spectra at the boundaries between the carbon layers and the ZnS- SiO$_2$ layers, and it can be seen that interaction close to chemical bonding exists between carbon and Ge-Sb-Te. FIGS. 5 and 6 show respectively three components obtained by resolving the respective spectra of carbon of FIGS. 1 and 2; spectra at the boundaries between the Ge-Sb-Te layers and the carbon layers, the spectra at the centers in the normal direction of the carbon layers and the spectra at the boundaries between the carbon layers and the ZnS- SiO$_2$ layers. In comparison between FIGS. 5 and 6, it can be seen that sample B thicker in carbon layer is mainly thicker in the spectrum component from the center of the carbon layer, i.e., the graphite component, compared to sample A.

From the above results, it is considered that since the boundary layer strongly sticks to the recording layer and the dielectric layer it is kept in contact with, by chemical bonding or interaction close to chemical bonding, separation at the interfaces is unlikely to occur during repeated recording. Furthermore, the interlayer separation is unlikely to occur during long-term storage, and this is considered to contribute to improving long-term storage stability. However, if the thickness of the boundary layer is larger, since it means that the thickness of a less strong layer existing near the center in the normal direction of the recording medium is thicker, this portion is likely to be destroyed to cause bursting errors during repeating.

When the second boundary layer is not provided, the composition of the recording layer of the present invention must be in the range represented by the following formula (I).

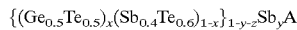

$$\{(Ge_{0.5}Te_{0.5})_x(Sb_{0.4}Te_{0.6})_{1-x}\}_{1-y-z}Sb_yA \quad (I)$$

where A represents at least one selected from the elements belonging to group 3A through group 6B of the 2nd period through the 6th period in the periodic table, excluding Ge, Sb and Te, and x, y and z satisfy the following relations:

$0.2 \leq x \leq 0.8$, $0.01 \leq y \leq 0.08$, $z=0$, or $0.2 \leq x \leq 0.8$, $0 \leq y \leq 0.08$, $0 < z \leq 0.2$ If x<0.2, the contrast between the crystalline phase and the amorphous phase is too small, and a sufficient signal intensity may not be obtained. If x>0.8, the crystallization rate becomes low to lower the erasability, and direct overwriting at a linear speed of 5 m/s or more and at the shortest mark length of 0.7 μm or less may become difficult. If z=0 and y<0.01, the amorphous stability declines and the archival property becomes poor. If y>0.08, the initial erasability may become low and the overwrite shelf property may become poor. If z>0.2, the crystallization rate becomes low to lower the erasability, and direct overwriting at a linear speed of 5 m/s or more and at the shortest mark length of 0.7 μm or less may become difficult, and the repeatability may be greatly lowered due to phase separation. Furthermore, the overwrite shelf property may become poor. If z=0, the amorphous stability may decline, and the archival property may become poor.

In the present invention, if the second boundary layer is provided, the crystallization rate of the recording layer becomes higher and the amorphous stability changes. So, the suitable composition of the recording layer is in the range represented by the following formula (II).

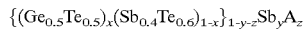

$$\{(Ge_{0.5}Te_{0.5})_x(Sb_{0.4}Te_{0.6})_{1-x}\}_{1-y-z}Sb_yA_z \quad (II)$$

where A represents at least one selected from the elements belonging to group 3A through group 6B of the 2nd period through the 6th period in the periodic table, excluding Ge, Sb and Te, and x, y and z satisfy the following relations:

$0.2 \leq x \leq 0.95$, $0.01 \leq y \leq 0.08$, $z=0$, or $0.2 \leq x \leq 0.95$, $0 \leq y \leq 0.08$, $0 < z \leq 0.2$ If x<0.2, the contrast becomes too small, and a sufficient signal intensity may not be obtained. If x>0.95, the crystallization rate becomes low to lower the erasability, and direct overwriting at a linear speed of 5 m/s or more and at the shortest mark length of 0.7 μm or less may become difficult. If z=0 and y<0.01, the amorphous stability declines and the archival property becomes poor. If y>0.08, the overwriting after long-term storage may become difficult. A preferable range of y at z=0 is $0.02 \leq y \leq 0.08$. If z>0.2, the crystallization rate becomes low to lower the erasability, and direct overwriting at a linear speed of 5 m/s or more and at the shortest mark length of 0.7 μm or less may become difficult.

The above trends in the relation between the above composition range of the recording layer and the recording properties can be more clearly observed in the recording media and evaluation methods in conformity with the standard described in DVD Specifications for Rewritable Disc/Part 1, Physical Specifications Ver. 1.0.

In the above, it is more preferable that the element A is at least one of the elements belonging to group 3A through group 4B of the 3rd period through the 6th period in the periodic table, i.e., Al, Si, Sc, Ti, V, Cr, Mn, Fe, Co, Ni, Cu, Zn, Ga, Ge, Y, Zr, Nb, Mo, Ru, Rh, Pd, Ag, Cd, In, Sn, La, Hf, Ta, W, Re, Ir, Pt, Au, Tl and Pb.

It is preferable that the thickness of the recording layer of the present invention is 5 nm to 40 nm. If the thickness of the recording layer is smaller than the above range, the recording properties by repeated overwriting is likely to become poor. If the thickness of the recording layer is larger than the above range, the recording layer is likely to be moved to tangential direction by repeated overwriting, to increase the jitters. Especially when mark length recording is adopted, the movement of the recording layer by recording and erasure is likely to occur, compared to pit position recording. To prevent it, the recording layer must be cooled more during recording. It is preferable that the thickness of the recording layer is 7 nm to 35 nm. A more preferable range is 7 nm to 25 nm.

The material of the second dielectric layer of the present invention can be the same as or different from the material of the first dielectric layer. It is preferable that the thickness of the second dielectric layer is 2 nm to 50 nm. If the thickness of the second dielectric layer is smaller than the above range, defects such as cracking are caused to lower the repetitive durability unpreferably. If the thickness of the second dielectric layer is larger than the above range, the recording layer is not cooled effectively. The thickness of the second dielectric layer greatly affects the cooling of the recording layer. To obtain better erasability and repetitive durability, especially to obtain good recordability and erasability in the case of mark length recording, it is preferable that the thickness of the second dielectric layer is 30 nm or less. It is preferable that the second dielectric layer is formed by a non-transparent material, for absorbing light for use as efficient thermal energy for recording and erasure. For example, a mixture consisting of ZnS, $SiO_2$ and carbon is preferable. The mixture is preferable since the residual stress of the film is small and since the recording sensitivity, carrier-to-noise ratio (C/N), erasing rate, etc. are less likely to be deteriorated by repeated recording and erasure.

In the present invention, if a reflection layer is provided as required, the recording sensitivity can be enhanced and the reproduced signal intensity can be increased. The material of the reflection layer can be a metal, alloy or a mixture consisting of a metal and a metal compound, etc. respectively capable of reflecting light. Preferable materials include metals with a high reflectance such as Al, Au, Ag and Cu, alloys mainly composed of them, nitrides and oxides of Al, Si, etc. and metal compounds such as chalcogenated compounds. Metals such as Al, Au and Ag and alloys mainly composed of them are especially preferable since a higher reflectance and a higher thermal conductivity can be obtained. Especially in view of material cost, alloys mainly composed of Al or Ag are preferable. The thickness of the reflection layer is usually about 10 nm to 300 nm. In view of higher recording sensitivity and larger reproduced signal intensity, a range of 30 nm to 200 nm is preferable.

The method for producing the optical recording medium of the present invention is described below. The method for forming the first dielectric layer, first boundary layer, recording layer, second boundary layer, second dielectric layer, reflection layer, etc. on the substrate can be a thin film forming method in vacuum, for example, vacuum evaporation, ion plating or sputtering, etc. Especially sputtering is preferable since the composition and layer thickness can be easily controlled. If the first and second boundary layers are composed of a compound of oxygen, nitrogen or carbon, etc., reactive sputtering using oxygen, nitrogen or hydrocarbon gas can be preferably adopted. The thickness of, for example, the recording layer formed can be easily controlled by monitoring the deposition state using, for example, a quartz oscillator film thickness meter.

After the reflection layer is formed, a dielectric layer of, for example, ZnS, $SiO_2$ or ZnS- $SiO_2$ or a protective layer of, for example, an ultraviolet ray setting resin can also be formed for prevention of flawing or deformation as far as the effects of the present invention are not remarkably impaired.

The present invention is described below based on examples.

Analyzing and Measuring Methods

The composition of each reflection layer or recording layer was confirmed by ICP emission spectroscopy (using an instrument produced by Seiko Denshi Kogyo K.K.). The thickness of each recording layer, dielectric layer or reflection layer in the process of being formed was monitored by a quartz oscillator film thickness meter. The thickness of each layer was measured by observing a section by a scanning electron microscope or a transmission electron microscope.

The composition of each first or second boundary layer was examined by X-ray photoelectron spectroscopy (SSX-100 produced by SSI) and Rutherford back scattering (AN-2500 produced by Nisshin High Voltage K.K.).

An optical recording medium with layers are formed by sputtering and the whole recording layer is crystallized and initialized by a beam of a semiconductor laser with a wavelength of 830 nm before recording.

Then, in the groove, 8/16 modulated random patterns were overwritten 100,000 times by mark length recording at a linear speed of 6 m/second using an optical head with a semiconductor laser of 660 nm wavelength and an object lens of 0.6 numerical aperture. The recording laser waveform used in this case was of general multipulse. The window width in this case was 34 ns (the shortest mark length in this case was 0.63 $\mu$m). The recording power and erasing power were set at the optimum levels for each optical recording medium. The jitters were measured by a time interval analyzer. The decreaseage of signal amplitude and the occurrence of bursting were observed by an oscilloscope.

EXAMPLE 1

A polycarbonate substrate having a spiral groove with a thickness of 0.6 mm, diameter of 12 cm and pitch of 1.48 $\mu$m (land width 0.74 $\mu$m and groove width 0.74 $\mu$m) was rotated at 30 rpm for sputtering. At first, a vacuum chamber was evacuated to $1 \times 10^{-3}$ Pa, and ZnS containing 20 mol % of $SiO_2$ was sputtered in 0.2 Pa Ar gas atmosphere, to form a 95 nm thick first dielectric layer on the substrate. Then, a carbon target was sputtered to form a 2 nm thick first boundary layer composed of carbon. In succession, an alloy target consisting of Ge, Sb and Te was sputtered to obtain a 20 nm thick recording layer composed of $Ge_{17.1}Sb_{27.6}Te_{55.3}$ [i.e., $\{(Ge_{0.5}Te_{0.5})_{0.349}(Sb_{0.4}Te_{0.6})_{0.651}\}_{0.979}Sb_{0.021}$]. Furthermore, a 16 nm thick second dielectric layer was formed by sputtering the same ZnS- $SiO_2$ as the first dielectric layer. On it, $Al_{97.5}Cr_{2.5}$ alloy was sputtered to form a 150 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 $\mu$m thick resin layer. Then, using a screen printing machine, a slow-acting ultraviolet light setting resin was applied and irradiated with ultraviolet light, and stuck onto another disc produced similarly, to obtain an optical recording medium of the present invention.

After overwriting 100,000 times, the jitters were measured and found to be 3.09 ns (9% of window width), being practically sufficiently small. The signal amplitude showed little change compared with the signal amplitude measured after overwriting 10 times, and bursting was not observed. The disc was recorded once and the byte error rate at that time was measured and found to be $2.5 \times 10^{-5}$. The recorded disc was allowed to stand in dry condition (in the air not adjusted in humidity by humidification, etc.) at 80° C. for 100 hours. Then, the byte error rate of the same portion was measured and found to be $3.0 \times 10^{-5}$, showing little change. Furthermore, the same portion was overwritten once, and the byte error rate was found to be $4.1 \times 10^{-5}$, showing little change. The jitters in this case was as good as 3.40 ns (10% of window width). Furthermore, a similar disc was allowed to stand at 90° C. and 80% relative humidity for 140 hours. The byte error rates before and after being allowed to stand were respectively $1.5 \times 10^{-5}$ and $2.0 \times 10^{-5}$, showing little change, and the bursting due to separation was not observed.

EXAMPLE 2

An optical recording medium was obtained as described for Example 1, except that the reflection layer was composed of $Al_{98.0}Hf_{1.8}Pd_{0.2}$. Measurement was effected as described for Example 1, and almost the same results could be obtained.

EXAMPLE 3

A optical recording medium was produced as described for Example 1, except that the recording layer was composed of $(Ge_2Sb_2Te_5)_{0.99}Nb_{0.01}$ [i.e., $\{(Ge_{0.5}Te_{0.5})_{0.444}(Sb_{0.4}Te_{0.6})_{0.556}\}_{0.990}Nb_{0.010}$].

After overwriting 100,000 times, the jitters were measured and found to be 3.41 ns (10% of window width), being practically sufficiently small. The signal amplitude showed little change compared with the signal amplitude measured after overwriting 10 times, and bursting was not observed. The optical recording medium was recorded once and the byte error rate at that time was measured and found to be $1.5 \times 10^{-5}$. The recorded optical recording medium was allowed to stand in dry condition (in the air not adjusted in humidity by humidification, etc.) and at 80° C. for 100 hours. Then, the byte error rate of the same portion was measured and found to be $1.5 \times 10^{-5}$, showing little change. Furthermore, the same portion was overwritten once, and the byte error rate was found to be $2.1 \times 10^{-5}$, showing little change. The jitters in this case were as good as 3.83 ns (11% of window width).

As the element A in the aforesaid recording layer, Al, Si, Sc, Ti, V, Cr, Mn, Fe, Co, Ni, Cu, Zn, Ga, Ge, Y, Zr, Mo, Ru, Rh, Pd, Ag, Cd, In, Sn, La, Hf, Ta, W, Re, Ir, Pt, Au, Tl or Pb was used respectively instead of Nb. Almost the same results could be obtained.

EXAMPLE 4

A optical recording medium was produced as described for Example 1, except that a ZnS target containing 20 mol % of $SiO_2$ and a carbon target were simultaneously sputtered to form a second dielectric layer composed of $\{(ZnS)_{80}(SiO_2)_{20}\}_{90}C_{10}$.

After overwriting 100,000 times, the jitters were measured and found to be 3.75 ns (11% of window width), being practically sufficiently small. The signal amplitude showed little change compared with the signal amplitude measured after overwriting 10 times, and bursting was not observed. The optical recording medium was recorded once and the byte error rate at that time was measured and found to be $1.5\times10^{-5}$. The recorded optical recording medium was allowed to stand in dry condition (in the air not adjusted in humidity by humidification, etc.) and at 80° C. for 100 hours. Then, the byte error rate of the same portion was measured and found to be $1.8\times10^{-5}$, showing little change. Furthermore, the same portion was overwritten once, and the byte error rate was found to be $2.1\times10^{-5}$, showing little change. The jitters in this case were as good as 3.05 ns (9% of window width). Furthermore, a similar optical recording medium was allowed to stand at 90° C. and 80% relative humidity for 140 hours. The byte error rates before and after being allowed to stand were respectively $2.5\times10^{-5}$ and $2.8\times10^{-5}$, showing little change, and the bursting due to separation was not observed.

EXAMPLE 5

A optical recording medium was produced as described for Example 1, except that a 2 nm second boundary layer composed of carbon was formed between the recording layer and the second dielectric layer, and that the recording layer was composed of $Ge_{16.2}Sb_{30.6}Te_{53.2}$ [i.e., $\{(Ge_{0.5}Te_{0.5})_{0.345}(Sb_{0.4}Te_{0.6})_{0.655}\}_{0.941}Sb_{0.059}$].

After overwriting 100,000 times, the jitters were measured and found to be 3.05 ns (9% of window width), being practically sufficiently small. The signal amplitude showed little change compared with the signal amplitude measured after overwriting 10 times, and bursting was not observed. The optical recording medium was recorded once and the byte error rate at that time was measured and found to be $0.8\times10^{-5}$. The recorded optical recording medium was allowed to stand in dry condition (in the air not adjusted in humidity by humidification, etc.) and at 80° C. for 100 hours. Then, the byte error rate of the same portion was measured and found to be $1.0\times10^{-5}$, showing little change. Furthermore, the same portion was overwritten once, and the byte error rate was found to be $0.8\times10^{-5}$, showing little change. The jitters in this case were as good as 2.55 ns (7.5% of window width). Furthermore, a similar optical recording medium was allowed to stand at 90° C. and 80% relative humidity for 140 hours. The byte error rates before and after being allowed to stand were respectively $1.0\times10^{-5}$ and $1.2\times10^{-5}$, showing little change, and the bursting due to separation was not observed.

EXAMPLE 6

A optical recording medium was produced as described for Example 1, except that a carbon target was sputtered at a pressure of 0.2 Pa using a mixed gas of argon:oxygen=9:1, to form a 2 nm thick second boundary layer composed of carbon and oxygen between the recording layer and the second dielectric layer.

After overwriting 100,000 times, the jitters were measured and found to be 3.39 ns (10% of window width), being practically sufficiently small. The signal amplitude showed little change compared with the signal amplitude measured after overwriting 10 times, and bursting was not observed. The optical recording medium was recorded once and the byte error rate at that time was measured and found to be $1.0\times10^{-5}$. The recorded optical recording medium was allowed to stand in dry condition (in the air not adjusted in humidity by humidification, etc.) and at 80° C. for 100 hours. Then, the byte error rate of the same portion was measured and found to be $1.0\times10^{-5}$, showing little change. Furthermore, the same portion was overwritten once, and the byte error rate was found to be $0.9\times10^{-5}$, showing little change. The jitters in this case were as good as 2.71 ns (8% of window width). Furthermore, a similar optical recording medium was allowed to stand at 90° C. and 80% relative humidity for 140 hours. The byte error rates before and after being allowed to stand were respectively $2.2\times10^{-5}$ and $2.5\times10^{-5}$, showing little change, and the bursting due to separation was not observed.

EXAMPLE 7

A optical recording medium was produced as described for Example 1, except that a carbon target was sputtered at a pressure of 0.2 Pa using a mixed gas of argon:oxygen:nitrogen=8:1:1, to form a 2 nm thick second boundary layer composed of carbon, oxygen and nitrogen between the recording layer and the second dielectric layer.

After overwriting 100,000 times, the jitters were measured and found to be 3.41 ns (10% of window width), being practically sufficiently small. The signal amplitude showed little change compared with the signal amplitude measured after overwriting 10 times, and bursting was not observed. The optical recording medium was recorded once and the byte error rate at that time was measured and found to be $2.5\times10^{-5}$. The recorded optical recording medium was allowed to stand in dry condition (in the air not adjusted in humidity by humidification, etc.) and at 80° C. for 100 hours. Then, the byte error rate of the same portion was measured and found to be $3.5\times10^{-5}$, showing little change. Furthermore, the same portion was overwritten once, and the byte error rate was found to be $2.5\times10^{-5}$, showing little change. The jitters in this case were as good as 2.72 ns (8.0% of window width).

EXAMPLE 8

A optical recording medium was produced as described for Example 1, except that the thickness of the first boundary layer composed of carbon was 0.5 nm.

After overwriting 100,000 times, the jitters were measured and found to be 3.77 ns (11% of window width), being practically sufficiently small. The signal amplitude showed little change compared with the signal amplitude measured after overwriting 10 times, and bursting was not observed.

The optical recording medium was recorded once and the byte error rate at that time was measured and found to be $2.0\times10^{-5}$. The recorded optical recording medium was allowed to stand at 80° C. for 100 hours in the air not adjusted in humidity by humidification, etc. Then, the byte error rate of the same portion was measured and found to be $3.5\times10^{-5}$, showing little change. Furthermore, the same portion was overwritten once, and the byte error rate was found to be $2.0\times10^{-5}$, showing little change. The jitters in this case were as good as 2.75 ns (8.0% of window width).

EXAMPLE 9

A optical recording medium was produced as described for Example 1, except that the thickness of the first boundary layer composed of carbon was 1.0 nm.

After overwriting 100,000 times, the jitters were measured and found to be 3.10 ns (9.1% of window width), being practically sufficiently small. The signal amplitude showed little change compared with the signal amplitude measured after overwriting 10 times, and bursting was not observed.

The optical recording medium was recorded once and the byte error rate at that time was measured and found to be $3.0\times10^{-5}$. The recorded optical recording medium was allowed to stand at 80°°C. for 100 hours in the air not adjusted in humidity by humidification, etc. Then, the byte error rate of the same portion was measured and found to be $3.5 \times 10^{-5}$, showing little change. Furthermore, the same portion was overwritten once, and the byte error rate was found to be $3.1 \times 10^{-5}$, showing little change. The jitters in this case were as good as 2.82 ns (8.2% of window width).

EXAMPLE 10

A optical recording medium was produced as described for Example 1, except that the thickness of the first boundary layer composed of carbon was 1.5 nm.

After overwriting 100,000 times, the jitters were measured and found to be 3.05 ns (8.9% of window width), being practically sufficiently small. The signal amplitude showed little change compared with the signal amplitude measured after overwriting 10 times, and bursting was not observed.

The optical recording medium was recorded once and the byte error rate at that time was measured and found to be $1.0 \times 10^{-5}$. The recorded optical recording medium was allowed to stand at 80° C. for 100 hours in the air not adjusted in humidity by humidification, etc. Then, the byte error rate of the same portion was measured and found to be $1.5 \times 10^{-5}$, showing little change. Furthermore, the same portion was overwritten once, and the byte error rate was found to be $2.0 \times 10^{-5}$, showing little change. The jitters in this case were as good as 2.65 ns (7.7% of window width).

EXAMPLE 11

A optical recording medium was produced as described for Example 1, except that the thickness of the first boundary layer composed of carbon was 5 nm.

After overwriting 1,000 times, the signal waveform was observed, and something like bursting was found.

The optical recording medium was recorded once, and the byte error rate at that time was measured and found to be $2.0 \times 10^{-5}$. The recorded optical recording medium was allowed to stand at 80° C. for 100 hours in the air not adjusted in humidity by humidification, etc. Then, the byte error rate of the same portion was measured and found to be $3.5 \times 10^{-5}$, showing little change. Furthermore, the same portion was overwritten once, and the byte error rate was found to be $3.5 \times 10^{-5}$, showing little change. The jitters in this case were as good as 2.90 ns (8.5% of window width).

EXAMPLE 12

A optical recording medium was produced as described for Example 1, except that the recording layer was composed of $Ge_{35.7}Sb_{12.6}Te_{51.7}$ [i.e., $\{(Ge_{0.5}Te_{0.5})_{0.728}(Sb_{0.4}Te_{0.6})_{0.272}\}_{0.981}Sb_{0.019}]$.

The optical recording medium was recorded once, and the byte error rate at that time was measured and found to be $1.1 \times 10^{-5}$. The recorded optical recording medium was allowed to stand at 80° C. for 100 hours in the air not adjusted in humidity by humidification, etc. Then, the byte error rate of the same portion was measured and found to be $1.4 \times 10^{-5}$, showing little change. Furthermore, the same portion was overwritten once, and the byte error rate was found to be $2.1 \times 10^{-5}$, showing little change. The Jitters in this case were as good as 2.73 ns (8.0% of window width).

EXAMPLE 13

A optical recording medium was produced as described for Example 1, except that a 2 nm thick second boundary layer composed of carbon was formed between the recording layer and the second dielectric layer, and that the recording layer was composed of $Ge_{29.5}Sb_{18.5}Te_{52.0}$ [i.e., $\{(Ge_{0.5}Te_{0.5})_{0.611}(Sb_{0.4}Te_{0.6})_{0.389}\}_{0.965}Sb_{0.035}]$.

The optical recording medium was recorded once, and the byte error rate at that time was measured and found to be $1.5 \times 10^{-5}$. The recorded optical recording medium was allowed to stand at 80° C. for 100 hours in the air not adjusted in humidity by humidification, etc. Then, the byte error rate of the same portion was measured and found to be $1.6 \times 10^{-5}$, showing little change. Furthermore, the same portion was overwritten once, and the byte error rate was found to be $2.2 \times 10^{-5}$, showing little change. The jitters in this case were as good as 2.79 ns (8.2% of window width).

COMPARATIVE EXAMPLE 1

A polycarbonate substrate having a spiral groove with a thickness of 0.6 mm, diameter of 12 cm and pitch of 1.48 $\mu$m (land width 0.74 $\mu$m and groove width 0.74 $\mu$m) was rotated at 30 rpm for sputtering. At first, a vacuum chamber was evacuated to $1 \times 10^{-3}$ Pa, and ZnS containing 20 mol % of $SiO_2$ was sputtered in 0.2 Pa Ar gas atmosphere, to form a 95 nm thick first dielectric layer on the substrate. In succession, an alloy target consisting of Ge, Sb and Te was sputtered to obtain a 20 nm thick recording layer composed of $Ge_{17.1}Sb_{27.6}Te_{55.3}$. Furthermore, a 16 nm thick second dielectric layer was formed by sputtering the same ZnS-$SiO_2$ as the first dielectric layer. On it, $Al_{97.5}Cr_{2.5}$ alloy was sputtered to form a 150 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 $\mu$m thick resin layer. Then, using a screen printing machine, a slow-acting ultraviolet light setting resin was applied and irradiated with ultraviolet light, and stuck onto another disc produced similarly, to obtain an optical recording medium.

Measurement was effected as described for Example 1. The jitters after overwriting 100,000 times were as large as 4.77 ns (14% of window width), and the signal amplitude was 70% of the amplitude measured after overwriting 10 times, to show a lower contrast. The error rate after recording once was $4.0 \times 10^{-5}$. As described for Example 1, the optical recording medium was allowed to stand in dry condition (in the air not adjusted in humidity by humidification, etc.) and at 80° C. for 100 hours. Then, the byte error rate of the same portion was measured and found to be $3.0 \times 10^{-5}$, showing little change. However, when the same portion was overwritten once, it was deteriorated so much that the byte error rate could not be measured. The errors were caused by increased litters, and the jitters at this time were about 6.13 ns (18% of window width).

COMPARATIVE EXAMPLE 2

A optical recording medium was produced as described for Comparative Example 1, except that a 2 nm thick second boundary layer composed of carbon was formed between the recording layer and the second dielectric layer. Measurement was effected as described for Example 1. The jitters after overwriting 100,000 times were as large as 5.09 ns (15% of window width), and the signal amplitude was 65% of the amplitude measured after overwriting 10 times, to show a lower contrast. The error rate after recording once was $1.8 \times 10^{-5}$. As described for Example 1, the optical recording medium was allowed to stand in dry condition (in the air not adjusted in humidity by humidification, etc.) and at 80° C. for 100 hours. Then, the byte error rate of the same portion was measured and found to be $2.4\times10^{-5}$, showing little change. However, when the same portion was overwritten once, it was deteriorated so much that the byte error rate could not be measured. The jitters measured at this time were about 6.46 ns (19% of window width).

COMPARATIVE EXAMPLE 3

A optical recording medium was produced as described for Comparative Example 1, except that the second dielectric layer was not formed, and that a 18 nm thick carbon layer was formed between the recording layer and the reflection layer. The carbon layer was formed by sputtering a carbon target in 0.2 Pa Ar gas atmosphere.

Measurement was effected as described for Example 1. The jitters after overwriting 100,000 times were as large as 5.11 ns (15%), and the signal amplitude was 60%. of the amplitude measured after overwriting 10 times, to show a lower contrast. The optical recording medium was allowed to stand at 90° C. and 80% relative humidity for 140 hours, and bursting considered to have been caused by separation between the second dielectric layer and the recording layer was observed.

COMPARATIVE EXAMPLE 4

A optical recording medium was produced as described for Comparative Example 1, except that the second dielectric layer was not formed, and that a 18 nm thick layer composed of carbon and oxide was formed between the recording layer and the reflection layer. The layer composed of carbon and oxygen was formed by sputtering a carbon target at a pressure of 0.2 Pa in a mixed gas atmosphere of argon:oxygen=9:1.

Measurement was effected as described for Example 1. The jitters after overwriting 100,000 times were as large as 4.75 ns (14% of window width), and the signal amplitude was 65% of the amplitude measured after overwriting 10 times, to show a lower contrast. The optical recording medium was allowed to stand at 90° C. and 80% relative humidity for 140 hours, and bursting considered to have been caused by separation between the second dielectric layer and the recording layer was observed.

COMPARATIVE EXAMPLE 5

A optical recording medium was obtained as described for Example 1, except that the recording layer was composed of $Ge_2Sb_2Te_5$ [i.e., $(Ge_{0.5}Te_{0.5})_{0.444}(Sb_{0.4}Te_{0.6})_{0.556}$].

The jitters after overwriting 100,000 times were measured and found to be 4.08 ns (12% of window width), being practically sufficiently small. The signal amplitude compared with the signal amplitude measured after overwriting 10 times showed little change, and bursting was not observed either.

The optical recording medium was recorded once, and the byte error rate at that time was measured and found to be $2.5\times10^{-5}$. The recorded optical recording medium was allowed to stand at 90° C. and 80% relative humidity for 140 hours. Then, the byte error rate of the same portion was measured and found to be $9.0\times10^{-3}$, to show large deterioration. The reproduced waveform was observed, and the amplitude was found to decrease. It was estimated that the amorphous portion was partially crystallized.

Even when the recording layer was composed of $Ge_1Sb_2Te_4$ [i.e., $(Ge_{0.5}Te_{0.5})_{0.286}(Sb_{0.4}Te_{0.6})_{0.714}$], the optical recording medium which was allowed to stand at 90° C. and 80% relatively humidity for 140 hours was deteriorated in byte error rate from $5.0\times10^{-3}$ to $2.0\times10^{-2}$, to show that the archival property was insufficient.

COMPARATIVE EXAMPLE 6

A optical recording medium was obtained as described for Example 1, except that the recording layer was composed of $Ge_{14.0}Sb_{36.0}Te_{50.0}$ [i.e., $\{(Ge_{0.5}Te_{0.5})_{0.318}(Sb_{0.4}Te_{0.6})_{0.682}\}_{0.880}Sb_{0.120}$]. The jitters measured after overwriting 10 times were measured and found to be only 6.83 ns (20% of window width) at the smallest. The cause was estimated to be low erasability.

COMPARATIVE EXAMPLE 7

A optical recording medium was obtained as described for Example 1, except that the recording layer was composed of $\{Ge_{42.0}Sb_{9.0}Te_{49.0}$ [i.e., $\{(Ge_{0.5}Te_{0.5})_{0.878}(Sb_{0.4}Te_{0.6})_{0.122}\}_{0.957}Sb_{0.043}$]. The jitters were measured after overwriting 10 times and found to be as large as 6.81 ns (20% of window width) at the smallest. The cause was estimated to be low erasability.

COMPARATIVE EXAMPLE 8

A optical recording medium was obtained as described for Example 1, except that the recording layer was composed of $Ge_{6.0}Sb_{38.0}Te_{56.0}$ [i.e., $\{(Ge_{0.5}Te_{0.5})_{0.126}(Sb_{0.4}Te_{0.6})_{0.874}\}_{0.953}Sb_{0.047}$]. The Jitters measured after overwriting 10 times were measured and found to be as large as 6.11 ns (18% of window width) at the smallest. The cause was estimated to be the low contrast of the amorphous phase.

COMPARATIVE EXAMPLE 9

A optical recording medium was obtained as described for Example 1, except that the recording layer was composed of $(Ge_2Sb_2Te_5)_{0.70}Nb_{0.30}$ [i.e., $\{(Ge_{0.5}Te_{0.5})_{0.444}(Sb_{0.4}Te_{0.6})_{0.556}\}_{0.7}Nb_{0.3}$]. The jitters were measured after overwriting 10 times and found to be as large as 6.80 ns (20% of window width) at the smallest. The cause was estimated to be low erasability.

EXAMPLE 14

A 6-layer optical recording medium was produced as described for Example 5, except that the recording layer was composed of $Ge_{33.9}Sb_{15.6}Te_{50.5}$ [i.e., $\{(Ge_{0.5}Te_{0.5})_{0.710}(Sb_{0.4}Te_{0.6})_{0.290}\}_{0.955}Sb_{0.045}$], and that the thicknesses of the first dielectric layer, carbon layer, recording layer, carbon layer, second dielectric layer and reflection layer were respectively 100 nm, 2 nm, 15 nm, 2 nm, 18 nm and 150 nm.

The optical recording medium was recorded once, and the byte error rate at that time was measured and found to be $2.0\times10^{-5}$. The recorded optical recording medium was allowed to stand at 80° C. for 100 hours in the air not adjusted in humidity by humidification, etc. Then, the byte error rate of the same portion was measured and found to be $2.8\times10^{-5}$, showing little change. Furthermore, the same portion was overwritten once, and it could be confirmed that the byte error rate showed no practical problem, being $1.0\times10^{-5}$. The jitters in this case were as good as 3.4 ns (10.0% of window width).

EXAMPLE 15

A optical recording medium was produced as described for Example 13, except that the recording layer was composed of $Ge_{34.6}Sb_{13.5}Te_{51.9}$ [i.e., $\{(Ge_{0.5}Te_{0.5})_{0.706}(Sb_{0.4}Te_{0.6})_{0.294}\}_{0.980}Sb_{0.020}$].

The optical recording medium was recorded once, and the byte error rate at that time was measured and found to be $7.05\times10^{-5}$. The recorded optical recording medium was allowed to stand at 80° C. for 100 hours in the air not adjusted in humidity by humidification, etc. Then, the byte error rate of the same portion was measured and found to be $1.00\times10^{-4}$, showing little change. Furthermore, the same portion was overwritten once, and it could be confirmed that the byte error rate showed no practical problem, being $1.27\times10^{-4}$. The jitters in this case were as good as 3.4 ns (10.0% of window width).

EXAMPLE 16

A optical recording medium was produced as described for Example 13, except that the recording layer was composed of $Ge_{37.0}Sb_{11.0}Te_{52.0}$ [i.e., $\{(Ge_{0.5}Te_{0.5})_{0.747}(Sb_{0.4}Te_{0.6})_{0.253}\}_{0.990}Sb_{0.010}$].

The optical recording medium was recorded once, and the byte error rate at that time was measured and found to be $1.78\times10^{-4}$. The recorded optical recording medium was allowed to stand at 80° C. for 100 hours in the air not adjusted in humidity by humidification, etc. Then, the byte error rate of the same portion was measured and found to be $3.15\times10^{-4}$, showing no practical problem. Furthermore, the same portion was overwritten once, and it could be confirmed that the byte error rate showed no practical problem, being $4.14\times10^{-4}$. The Jitters in this case were as good as 3.9 ns (11.3% of window width).

EXAMPLE 17

A optical recording medium was produced as described for Example 13, except that the recording layer was composed of $Ge_{40.4}Sb_{8.4}Te_{51.2}$ [i.e., $\{(Ge_{0.5}Te_{0.5})_{0.818}(Sb_{0.4}Te_{0.6})_{0.182}\}_{0.988}Sb_{0.012}$].

The optical recording medium was recorded once, and the byte error rate at that time was measured and found to be $1.57\times10^{-3}$. The recorded optical recording medium was allowed to stand at 80° C. for 100 hours in the air not adjusted in humidity by humidification, etc. Then, the byte error rate of the same portion was measured and found to be $1.9\times10^{-3}$. Furthermore, the same portion was overwritten once, and the byte error rate was found to be $1.39\times10^{-3}$, showing that the error rate did not become worse after overwriting. The Jitters in this case were as good as 4.5 ns (13.1% of window width).

COMPARATIVE EXAMPLE 10

A 6-layer optical recording medium was obtained as described for Example 5, except that the recording layer was composed of $Ge_2Sb_2Te_5$ [i.e., $(Ge_{0.5}Te_{0.5})_{0.444}(Sb_{0.4}Te_{0.6})_{0.556}$].

The optical recording medium was recorded once, and the byte error rate at that time was measured and found to be $2.5\times10^{-5}$. The recorded optical recording medium was allowed to stand at 80° C. for 100 hours. Then, the byte error rate of the same portion was attempted to be measured, but could not be measured because of deterioration. The reproduced waveform was observed, and the amplitude was found to greatly decrease. It was estimated that the amorphous portion was partially crystallized.

Even when the recording layer was composed of $Ge_1Sb_2Te_4$ [i.e., $(Ge_{0.5}Te_{0.5})_{0.286}(Sb_{0.4}Te_{0.6})_{0.714}$], the optical recording medium which was allowed to stand at 90° C. and 80% relative humidity for 140 hours was greatly deteriorated in a byte error rate from $5.0\times10^{-3}$ to a state not allowing measurement, showing that the archival property was insufficient.

COMPARATIVE EXAMPLE 11

A 6-layer optical recording medium was produced as described for Example 13, except that the recording layer was composed of $Ge_{0.5}Te_{0.5}$ [i.e., $\{(Ge_{0.5}Te_{0.5})_{1.00}(Sb_{0.4}Te_{0.6})_{0.00}\}_{1.00}Sb_{0.00}$].

The optical recording medium was recorded once, and the byte error rate was attempted to be measured but could not be measured. The reason is that the jitters were as high as 20%.

EXAMPLE 18

A polycarbonate substrate having a guide groove with a thickness of 0.6 mm, diameter of 12 cm and pitch of 1.48 $\mu$m (land width 0.74 $\mu$m and groove width 0.74 $\mu$m) was rotated at 30 rpm for sputtering as follows. At first, a vacuum chamber was evacuated to $1\times10^{-3}$ Pa, and ZnS containing 20 mol % of $SiO_2$ was sputtered in $2\times10^{-1}$ Pa Ar gas atmosphere, to form a 95 nm thick first dielectric layer on the substrate. Then, chromium was sputtered in Ar gas atmosphere containing 50% of $N_2$ gas, to form a 2 nm thick first boundary layer composed of chromium and nitrogen. In succession, an alloy target consisting of Ge, Sb and Te was sputtered under the same conditions as used for forming the first dielectric layer, to form a 19 nm thick recording layer composed of $Ge_{17.1}Sb_{27.6}Te_{55.3}$ [i.e., $\{(Ge_{0.5}Te_{0.5})_{0.349}(Sb_{0.4}Te_{0.6})_{0.651}\}_{0.979}Sb_{0.021}$]. Furthermore, a 15 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disk was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 $\mu$m thick resin layer. Then, using a screen printing machine, a slow-acting ultraviolet light setting resin was applied and irradiated with ultraviolet light, and stuck onto another disc produced similarly, to obtain an optical recording medium of the present invention.

The composition distribution of the first boundary layer of the optical recording medium in the normal direction was examined, and the atom composition ratio of chromium:nitrogen was 8:2 at near the interface with the recording layer and 8:3 at near the interface with the first dielectric layer.

After overwriting 10,000 times, the jitters were measured and found to be 3.06 ns, being practically sufficiently as small as 9% of window width. The signal amplitude times showed little change compared with the signal amplitude measured after overwriting 10, and bursting was not observed. The optical recording medium was recorded once and the byte error rate at that time was measured and found to be $2.5\times10^{-5}$. The recorded optical recording medium was allowed to stand in air at 80° C. for 100 hours. Then, the byte error rate of the same portion was measured and found to be $3.0\times10^{-5}$, showing little change. Furthermore, the same portion was overwritten once, and the byte error rate was found to be $4.1\times10^{-5}$, showing little change. The jitters in this case were as good as 3.42 ns (10% of window width). It was also confirmed visually that interlayer separation did not occur.

EXAMPLE 19

A optical recording medium was produced as described for Example 18, except that the thickness of the first boundary layer was 10 nm. After overwriting 10,000 times, the jitters were measured and found to be 3.16 ns (9.3% of window width), being practically sufficiently small. The signal amplitude showed little change compared with the signal amplitude measured after overwriting 10 times, and bursting was not observed either.

The optical recording medium was recorded once and the byte error rate at that time was measured and found to be $2.8 \times 10^{-5}$. The recorded optical recording medium was allowed to stand in air at 80° C. for 100 hours. Then, the byte error rate of the same portion was measured and found to be $3.3 \times 10^{-5}$, showing little change. Furthermore, the same portion was overwritten once, and the byte error rate was found to be $4.8 \times 10^{-5}$, showing little change. The jitters in this case were as good as 3.57 ns (10.5% of window width). It was also confirmed visually that interlayer separation did not occur. The composition distribution of the first boundary layer in the normal direction was examined, and the atom composition ratio of chromium:nitrogen was 8:2 at near the interface with the recording layer and 8:3 at near the interface with the first dielectric layer.

EXAMPLE 20

A optical recording medium was produced as described for Example 18, except that the thickness of the first boundary layer was 20 nm. After overwriting 10,000 times, the jitters were measured and found to be 3.19 ns (9.4% of window width), being practically sufficiently small. The signal amplitude showed little change compared with the signal amplitude measured after overwriting 10 times, and bursting was not observed either.

The optical recording medium was recorded once and the byte error rate at that time was measured and found to be $2.5 \times 10^{-5}$. The recorded optical recording medium was allowed to stand in air at 80° C. for 100 hours. Then, the byte error rate of the same portion was measured and found to be $3.5 \times 10^{-5}$, showing little change. Furthermore, the same portion was overwritten once, and the byte error rate was found to be $4.8 \times 10^{-5}$, showing little change. The Jitters in this case were as good as 3.67 ns (10.8% of window width). It was also confirmed visually that interlayer separation did not occur. The composition distribution of the first boundary layer in the normal direction was examined, and the atom composition ratio of chromium:nitrogen was 8:3.5 at near the interface with the recording layer and 8:3 at near the interface with the first dielectric layer.

EXAMPLE 21

A optical recording medium was produced as described for Example 18, except that the first boundary layer was formed by using germanium instead of chromium. After overwriting 10,000 times, the jitters were measured and found to be 3.03 ns (8.9% of window width), being practically sufficiently small. The signal amplitude showed little change compared with the signal amplitude measured after overwriting 10 times, and bursting was not observed either.

The optical recording medium was recorded once and the byte error rate at that time was measured and found to be $2.3 \times 10^{-5}$. The recorded optical recording medium was allowed to stand in air at 80° C. for 100 hours. Then, the byte error rate of the same portion was measured and found to be $2.3 \times 10^{-5}$, showing little change. Furthermore, the same portion was overwritten once, and the byte error rate was found to be $4.3 \times 10^{-5}$, showing little change. The jitters in this case were as good as 3.33 ns (9.8% of window width). It was also confirmed visually that interlayer separation did not occur. The composition distribution of the first boundary layer of the optical recording medium in the normal direction was examined, and the atom composition ratio of germanium:nitrogen was 7:2 at near the interface with the recording layer and 7:3 at near the interface with the protective layer.

EXAMPLE 22

A optical recording medium was produced as described for Example 21, except that the thickness of the first boundary layer was 8 nm. After overwriting 10,000 times, the jitters were measured and found to be 2.99 ns (8.8% of window width), being practically sufficiently small. The signal amplitude showed little change compared with the signal amplitude measured after overwriting 10 times, and bursting was not observed either.

The optical recording medium was recorded once and the byte error rate at that time was measured and found to be $2.4 \times 10^{-5}$. The recorded optical recording medium was allowed to stand in air at 80° C. for 100 hours. Then, the byte error rate of the same portion was measured and found to be $2.4 \times 10^{-5}$, showing little change. Furthermore, the same portion was overwritten once, and the byte error rate was found to be $4.1 \times 10^{-5}$, showing little change. The jitters in this case were as good as 3.34 ns (9.8% of window width). It was also confirmed visually that interlayer separation did not occur. The composition distribution of the first boundary layer of the optical recording medium in the normal direction was examined, and the atom composition ratio of germanium:nitrogen was 7:2 at near the interface with the recording layer and 7:3 at near the interface with the first dielectric layer.

EXAMPLE 23

A polycarbonate substrate having a guide groove with a thickness of 0.6 mm, diameter of 12 cm and pitch of 1.48 μm (land width 0.74 μm and groove width 0.74 μm) was rotated at 30 rpm for sputtering as follows. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 95 nm thick first dielectric layer on the substrate. Then, a germanium target having chromium pellets on it was sputtered in Ar gas atmosphere containing 40% of $N_2$ gas, to form an 8 nm thick first boundary layer composed of germanium, chromium and nitrogen. In succession, an alloy target consisting of Ge, Sb and Te was sputtered under the same conditions as used for forming the first dielectric layer, to form a 19 nm thick recording layer composed of $Ge_{17.1}Sb_{27.6}Te_{55.3}$. Furthermore, a 15 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 μm thick resin layer. Then, using a screen printing machine, a slow-acting ultraviolet light setting resin was applied and irradiated with ultraviolet light, and stuck onto another disc produced similarly, to obtain an optical recording medium of the present invention.

After overwriting 10,000 times, the jitters were measured and found to be 3.06 ns (9% of window width), being practically sufficiently small. The signal amplitude showed little change compared with the signal amplitude measured after overwriting 10 times, and bursting was not observed either.

The optical recording medium was recorded once and the byte error rate at that time was measured and found to be $2.3 \times 10^{-5}$. The recorded optical recording medium was allowed to stand in air at 80° C. for 100 hours. Then, the byte error rate of the same portion was measured and found to be $2.3 \times 10^{-5}$, showing no change. Furthermore, the same portion was overwritten once, and the byte error rate was found to be $4.0 \times 10^{-5}$ showing little change. The jitters in this case were as good as 3.39 ns (10% of window width). It was also confirmed visually that interlayer separation did not occur.

The composition distribution of the first boundary layer of the optical recording medium in the normal direction was examined, and the atom composition ratio of germanium:chromium:nitrogen was 20:5:3 at near the interface with the recording layer and 20:5:5 at near the interface with the first dielectric layer.

EXAMPLE 24

A optical recording medium was produced as described for Example 23, except that the recording layer was composed of $Ge_{19.1}Sb_{26.9}Te_{54.0}$ [i.e., $\{(Ge_{0.5}Te_{0.5})_{0.396}(Sb_{0.4}Te_{0.6})_{0.604}\}_{0.964}Sb_{0.036}$], and the recording properties were evaluated. The results were almost same as obtained in Example 23.

EXAMPLE 25

A optical recording medium was produced as described for Example 23, except that the recording layer was composed of $Ge_{21.0}Sb_{25.2}Te_{53.8}$ [i.e., $\{(Ge_{0.5}Te_{0.5})_{0.434}(Sb_{0.4}Te_{0.6})_{0.566}\}_{0.967}Sb_{0.033}$], and the recording properties were evaluated. The results were almost same as obtained in Example 23.

EXAMPLE 26

A optical recording medium was produced as described for Example 23, except that the recording layer was composed of $Ge_{15.5}Sb_{28.8}Te_{55.7}$ [i.e., $\{(Ge_{0.5}Te_{0.5})_{0.316}(Sb_{0.4}Te_{0.6})_{0.684}\}_{0.980}Sb_{0.020}$], and the recording properties were evaluated. The results were almost same as obtained in Example 23.

EXAMPLE 27

A optical recording medium was produced as described for Example 23, except that the recording layer was composed of $Ge_{18.0}Sb_{26.8}Te_{54.8}Nb_{0.4}$ [i.e., $[\{(Ge_{0.5}Te_{0.5})_{0.371}(Sb_{0.4}Te_{0.6})_{0.629}\}_{0.977}Sb_{0.023}]_{0.996}Nb_{0.004}$], and the recording properties were evaluated. The results were almost same as obtained in Example 23.

EXAMPLE 28

A optical recording medium was produced as described for Example 23, except that the recording layer was composed of $Ge_{17.9}Sb_{26.4}Te_{55.1}Ag_{0.6}$ [i.e., $[\{(Ge_{0.5}Te_{0.5})_{0.366}(Sb_{0.4}Te_{0.6})_{0.634}\}_{0.984}Sb_{0.016}]_{0.994}Ag_{0.006}$], and the recording properties were evaluated. The results were almost same as obtained in Example 23.

EXAMPLE 29

Optical recording media were produced as described for Example 18, except that aluminum, titanium or zirconium was used to form the first boundary layer instead of chromium, and recording properties were evaluated similarly. The results were almost same as obtained in Example 18. That is, the jitters after overwriting 10,000 times were measured, and it was confirmed that the values of all the optical recording media were practically sufficiently as small as 9% of window width. With all the optical recording media, the signal amplitude showed little change compared with the signal amplitude measured after overwriting 10 times, and with any of the optical recording mediums, bursting was not observed. The respective optical recording media were recorded once, and the byte error rates at that time were measured and found to be $2.5 \times 10^{-5}$, $2.8 \times 10^{-5}$ and $2.9 \times 10^{-5}$ respectively.

EXAMPLE 30

A polycarbonate substrate having a guide groove with a thickness of 0.6 mm, diameter of 12 cm and pitch of 1.48 $\mu$m (land width 0.74 $\mu$m and groove width 0.74 $\mu$m) was rotated at 30 rpm for sputtering as follows. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 93 nm thick first dielectric layer on the substrate. Then, a chromium target was sputtered in a mixed gas consisting of 50% of nitrogen and 50% of argon, to form a 2 nm thick first boundary layer. In succession, an alloy target consisting of Ge, Sb and Te was sputtered to obtain a 19 nm thick recording layer composed of $Ge_{33.9}Sb_{15.6}Te_{50.5}$ [i.e., $\{(Ge_{0.5}Te_{0.5})_{0.710}(Sb_{0.4}Te_{0.6})_{0.290}\}_{0.955}Sb_{0.045}$]. Furthermore, a chromium target was sputtered in a mixed gas consisting of 40% of nitrogen and 60% of argon, to form a 2 nm thick second boundary layer. In succession, a 13 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 $\mu$m thick resin layer. Then, using a screen printing machine, a slow-acting ultraviolet light setting resin was applied and irradiated with ultraviolet light, and stuck onto another disc produced similarly, to obtain an optical recording medium of the present invention.

The optical recording medium was recorded once and the byte error rate at that time was measured and found to be $3.9 \times 10^{-5}$. The recorded optical recording medium was allowed to stand at 80° C. for 100 hours in the air not adjusted in humidity by humidification, etc. Then, the byte error rate of the same portion was measured and found to be $4.8 \times 10^{-5}$, showing little change. Furthermore, the same portion was overwritten once, and it could be confirmed that the byte error rate showed no practical problem, being $2.0 \times 10^{-5}$. The jitters in this case were as good as 3.4 ns (10.0% of window width).

EXAMPLE 31

A 6-layer optical recording medium was produced as described for Example 30, except that the recording layer was composed of $Ge_{34.1}Sb_{15.3}Te_{50.6}$ [i.e., $\{(Ge_{0.5}Te_{0.5})_{0.713}(Sb_{0.4}Te_{0.6})_{0.287}\}_{0.958}Sb_{0.042}$].

The optical recording medium was recorded once and the byte error rate at that time was measured and found to be $6.8 \times 10^{-5}$. The recorded optical recording medium was allowed to stand at 80° C. for 100 hours in the air not adjusted in humidity by humidification, etc. Then, the byte error rate of the same portion was measured and found to be $1.3 \times 10^{-4}$, showing little change. Furthermore, the same portion was overwritten once, and it could be confirmed that the byte error rate showed no practical problem, being $4.9 \times 10^{-4}$. The jitters in this case were as good as 3.6 ns (10.6% of window width).

EXAMPLE 32

A 6-layer optical recording medium was produced as described for Example 30, except that the recording layer was composed of $Ge_{36.2}Sb_{13.0}Te_{50.8}$ [i.e., $\{(Ge_{0.5}Te_{0.5})_{0.747}(Sb_{0.4}Te_{0.6})_{0.253}\}_{0.968}Sb_{0.032}$].

The optical recording medium was recorded once and the byte error rate at that time was measured and found to be $2.9 \times 10^{-4}$. The recorded optical recording medium was allowed to stand at 80° C. for 100 hours in the air not adjusted in humidity by humidification, etc. Then, the byte error rate of the same portion was measured and found to be $4.9 \times 10^{-4}$, showing no practical problem. Furthermore, the same portion was overwritten once, and it could be confirmed that the byte error rate showed no practical problem, being $4.4 \times 10^{-4}$. The jitters in this case were 4.0 ns (11.8% of window width).

EXAMPLE 33

A 6-layer optical recording medium was produced as described for Example 30, except that the recording layer was composed of $Ge_{39.6}Sb_{10.2}Te_{50.2}$ [i.e., $\{(Ge_{0.5}Te_{0.5})_{0.818}(Sb_{0.4}Te_{0.6})_{0.182}\}_{0.969}Sb_{0.031}$].

The optical recording medium was recorded once and the byte error rate at that time was measured and found to be $1.5 \times 10^{-5}$. The recorded optical recording medium was allowed to stand at 80° C. for 100 hours in the air not adjusted in humidity by humidification, etc. Then, the byte error rate of the same portion was measured and found to be $1.9 \times 10^{-3}$. Furthermore, the same portion was overwritten once, and the byte error rate was $2.2 \times 10^{-3}$, showing that the error rate was not worsened after overwriting. The jitters in this case were 4.3 ns (12.6% of window width).

EXAMPLE 34

A 6-layer optical recording medium was produced as described for Example 30, except that the recording layer was composed of $Ge_{27.0}Sb_{20.0}Te_{53.0}$ [i.e., $(Ge_{0.5}Te_{0.5})_{0.555}(Sb_{0.4}Te_{0.6})_{0.445}\}_{0.973}Sb_{0.027}$].

The optical recording medium was recorded once and the byte error rate at that time was measured and found to be $2.9 \times 10^{-5}$. The recorded optical recording medium was allowed to stand at 80°°C. for 100 hours in the air not adjusted in humidity by humidification, etc. Then, the byte error rate of the same portion was measured and found to be $4.1 \times 10^{-4}$, showing some rise. Furthermore, the same portion was overwritten once, and the byte error rate was $6.7 \times 10^{-5}$, showing that the error rate was not worsened after overwriting. The jitters in this case were 3.2 ns (9.4% of window width).

COMPARATIVE EXAMPLE 12

A 6-layer optical recording medium was produced as described for Example 30, except that the recording layer was composed of $Ge_2Sb_2Te_5$ [i.e., $(Ge_{0.5}Te_{0.5})_{0.444}(Sb_{0.4}Te_{0.6})_{0.556}$].

The optical recording medium was recorded once and the byte error rate at that time was measured and found to be $3.0 \times 10^{-5}$. The recorded optical recording medium was allowed to stand at 90° C. and 80% relative humidity for 140 hours. The byte error rate of the same portion was attempted to be measured, but could not be measured because of deterioration. The reproduced waveform was observed and it was found that the amplitude decreased greatly. It was estimated that the amorphous portion was partially crystallized.

Even when the recording layer was composed of $Ge_1Sb_2Te_4$ [i.e., $(Ge_{0.5}Te_{0.5})_{0.286}(Sb_{0.4}Te_{0.6})_{0.714}$], the optical recording medium which was allowed to stand at 90° C. and 80% relative humidity for 140 hours was greatly deteriorated in byte error rate from $4.1 \times 10^{-3}$ to a state not allowing measurement, to show that the archival property was insufficient.

COMPARATIVE EXAMPLE 13

A 6-layer optical recording medium was produced as described for Example 30, except that the recording layer was composed of $Ge_{0.5}Te_{0.5}$ [i.e., $\{(Ge_{0.5}Te_{0.5})_{1.00}(Sb_{0.4}Te_{0.6})_{0.00}\}_{1.00}Sb_{0.00}$].

The optical recording medium was recorded once and the byte error rate at that time was attempted to be measured but could not be measured. The reason is that the jitters were as high as 20%.

EXAMPLE 35

A polycarbonate substrate having a guide groove with a thickness of 0.6 mm, diameter of 12 cm and pitch of 1.48 μm (land width 0.74 μm and groove width 0.74 μm) was rotated at 30 rpm for sputtering as follows. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 95 nm thick first dielectric layer on the substrate. Then, titanium was sputtered in Ar gas atmosphere containing 8.2% of $N_2$ gas, to form a 2 nm thick first boundary layer composed of $TiN_{0.87}$. In succession, an alloy target consisting of Ge, Sb and Te was sputtered under the conditions used for forming the first dielectric layer, to obtain a 19 nm thick recording layer composed of $Ge_{17.1}Sb_{27.6}Te_{55.3}$. Furthermore, a 15 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 μm thick resin layer. Then, using a screen printing machine, a slow-acting ultraviolet light setting resin was applied and irradiated with ultraviolet light, and stuck onto another disc produced similarly, to obtain an optical recording medium of the present invention.

After overwriting 10,000 times, the jitters were measured and found to be 3.02 ns, being practically sufficiently as small as 8.9% of window width. The signal amplitude showed little change compared with the signal amplitude measured after overwriting 10 times, and bursting was not observed either. The optical recording medium was recorded once and the byte error rate at that time was measured andfoundto be $1.5 \times 10^{-5}$. Therecorded optical recording medium was allowed to stand in air at 80° C. for 100 hours. Then, the byte error rate of the same portion was measured and found to be $2.5 \times 10^{-5}$, showing little change. Furthermore, the same portion was overwritten once, and the byte error rate was found to be $3.1 \times 10^{-5}$, showing little change. The jitters in this case were as good as 3.38 ns corresponding to 9.9% of window width. It was also confirmed visually that interlayer separation did not occur.

Moreover, a optical recording medium with a 2 nm thick second boundary layer composed of $TiN_{0.87}$ formed between the recording layer and the second dielectric layer was also produced, and its recording properties were evaluated. After overwriting 10,000 times, the Jitters were measured and found to be 2.95 ns (8.7% of window width), being practically sufficiently small. The signal amplitude showed little change compared with the signal amplitude measured after overwriting 10 times, and bursting was not observed either. The optical recording medium was recorded once, and the byte error rate at that time was measured and found to be $1.3 \times 10^{-5}$. The recorded optical recording medium was allowed to stand at 90° C. and 80% relative humidity for 100 hours. Then, the byte error rate of the same portion was measured and found to be $1.5 \times 10^{-5}$, showing little change. Furthermore, the same portion was overwritten once, and the byte error rate was found to be $1.9 \times 10^{-5}$, showing little change. The jitters at this time was as good as 3.11 ns (9.2% of window width). It was also visually confirmed that the interlayer separation did not occur.

EXAMPLE 36

A polycarbonate substrate having a guide groove with a thickness of 0.6 mm, diameter of 12 cm and pitch of 1.48 µm (land width 0.74 µm and groove width 0.74 µm) was rotated at 30 rpm for sputtering as follows. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 93 nm thick first dielectric layer on the substrate. Then, a SiC target with Si chips on it was sputtered, to form a 2 nm thick first boundary layer composed of $SiC_{0.33}$. In succession, an alloy target consisting of Ge, Sb and Te was sputtered to form a 19 nm thick recording layer composed of $Ge_{17.1}Sb_{27.6}Te_{55.3}$ [i.e., $\{(Ge_{0.5}Te_{0.5})_{0.349}(Sb_{0.4}Te_{0.6})_{0.651}\}_{0.979}Sb_{0.021}$]. Furthermore, a 15 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disk was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 µm thick resin layer. Then, using a screen printing machine, a slow-acting ultraviolet light setting resin was applied and irradiated with ultraviolet light, and stuck onto another disc produced similarly, to obtain an optical recording medium of the present invention.

After overwriting 10,000 times, the jitters were measured and found to be 3.05 ns, being practically sufficiently as small as 9% of window width. The signal amplitude showed little change compared with the signal amplitude measured after overwriting 10 times, and bursting was not observed. The optical recording medium was recorded once and the byte error rate at that time was measured and found to be $2.2 \times 10^{-5}$. The recorded optical recording medium was allowed to stand in air at 80° C. for 100 hours. Then, the byte error rate of the same portion was measured and found to be $3.8 \times 10^{-5}$, showing little change. Furthermore, the same portion was overwritten once, and the byte error rate was found to be $4.6 \times 10^{-5}$, showing little change. The jitters in this case were as good as 3.39 ns corresponding to 10% of window width. It was also confirmed visually that interlayer separation did not occur.

EXAMPLE 37

A optical recording medium was produced as described for Example 36, except that the recording layer was composed of $Ge_{17.1}Sb_{29.8}Te_{53.1}$ [i.e., $\{(Ge_{0.5}Te_{0.5})_{0.363}(Sb_{0.4}Te_{0.6})_{0.637}\}_{0.942}Sb_{0.058}$], and that a 2 nm thick second boundary layer composed of $SiC_{0.33}$ similar to the first boundary layer was formed between the recording layer and the second dielectric layer.

After overwriting 50,000 times, the jitters were measured and found to be 3.06 ns, being practically sufficiently as small as 9% of window width. The signal amplitude showed little change compared with the signal amplitude measured after overwriting 10 times, and bursting was not observed. The optical recording medium was recorded once and the byte error rate at that time was measured and found to be $2.5 \times 10^{-5}$. The recorded optical recording medium was allowed to stand in air at 80° C. for 100 hours. Then, the byte error rate of the same portion was measured and found to be $3.3 \times 10^{-5}$, showing little change. Furthermore, the same portion was overwritten once, and the byte error rate was found to be $4.0 \times 10^{-5}$, showing little change. The jitters in this case were as good as 10% of window width. It was also confirmed visually that interlayer separation did not occur.

EXAMPLE 38

A optical recording medium was produced as described for Example 36, except that the recording layer was composed of $Ge_{20.1}Sb_{25.5}Te_{54.4}$ [i.e., $\{(Ge_{0.5}Te_{0.5})_{0.413}(Sb_{0.4}Te_{0.6})_{0.587}\}_{0.974}Sb_{0.026}$], and that a Zr target was sputtered in a mixed gas consisting of 40% of oxygen and 60% of argon, to form a 2 nm first boundary layer composed of $ZrO_{0.3}$.

After overwriting 10,000 times, the jitters were measured and found to be 3.05 ns, being practically sufficiently as small as 9% of window width. The signal amplitude compared with the signal amplitude measured after overwriting 10 times showed little change, and bursting was not observed either. The optical recording medium was recorded once and the byte error rate at that time was measured and found to be $2.9 \times 10^{-5}$. The recorded optical recording medium was allowed to stand in air at 80°°C. for 100 hours. Then, the byte error rate of the same portion was measured and found to be $4.1 \times 10^{-5}$, showing little change. Furthermore, the same portion was overwritten once, and the byte error rate was found to be $4.9 \times 10^{-5}$, showing little change. The jitters in this case were as good as 3.39 ns corresponding to 10% of window width. It was also confirmed visually that interlayer separation did not occur.

EXAMPLE 39

A optical recording medium was produced as described for Example 36, except that the recording layer was composed of $Ge_{18.3}Sb_{28.3}Te_{53.4}$ [i.e., $\{(Ge_{0.5}Te_{0.5})_{0.385}(Sb_{0.4}Te_{0.6})_{0.615}\}_{0.951}Sb_{0.049}$], and that a 2 nm thick second boundary layer composed of $ZrO_{0.3}$ similar to the first boundary layer was formed between the recording layer and the second dielectric layer.

After overwriting 50,000 times, the jitters were measured and found to be 3.08 ns, being practically sufficiently as small as 9% of window width. The signal amplitude showed little change compared with the signal amplitude measured after overwriting 10 times, and bursting was not observed either. The optical recording medium was recorded once and the byte error rate at that time was measured and found to be $3.0 \times 10^{-5}$. The recorded optical recording medium was allowed to stand in air at 80° C. for 100 hours. Then, the byte error rate of the same portion was measured and found to be $3.3 \times 10^{-5}$, showing little change. Furthermore, the same portion was overwritten once, and the byte error rate was found to be $3.9 \times 10^{-5}$, showing little change. The jitters in this case were as good as 3.40 nm corresponding to 10% of window width. It was also confirmed visually that interlayer separation did not occur.

COMPARATIVE EXAMPLE 14

A optical recording medium was produced as described for Example 36, except that the first boundary layer was not formed.

After overwriting 10,000 times, the jitters were measured and found to be as large as 4.09 ns corresponding to 12% of window width. The signal amplitude decreased to about 80% compared with the signal amplitude after overwriting 10 times, to show a lower contrast. The optical recording medium was recorded once and the byte error rate at that time was measured and found to be $2.9 \times 10^{-5}$. The recorded optical recording medium was allowed to stand in air at 80° C. for 100 hours. Then, the byte error rate of the same portion was measured and found to be $4.1 \times 10^{-5}$, showing little change. Furthermore, the same portion was overwritten once, and the byte error rate was too large to be measured.

EXAMPLE 40

A optical recording medium was produced as described for Example 36, except that a 2 nm first boundary layer composed of $Al_2O_{2.50}$ (p=0.50) was formed by sputtering an Al target in a mixed gas consisting of 16.7% of oxygen and 63.3% of argon. After overwriting 10,000 times, the jitters were measured and found to be 2.43 ns (7.1% of window width), being practically sufficiently small. The signal amplitude showed little change compared with the signal amplitude measured after overwriting 10 times, and bursting was not observed. The optical recording medium was recorded once and the byte error rate at that time was measured and found to be $9.9 \times 10^{-6}$. The recorded optical recording medium was allowed to stand at 90°°C. and 80% relative humiditly for 70 hours. Then, the byte error rate of the same portion was measured and found to be $9.9 \times 10^{-6}$, showing no change at all. Furthermore, the same portion was overwritten once, and the byte error rate was found to be $1.8 \times 10^{-5}$, showing a little change. The jitters in this case were as good as 3.25 nm (9.6% of window width). It was also confirmed visually that interlayer separation did not occur.

EXAMPLE 41

A optical recording medium was produced as described for Example 36, except that a 2 nm thick first boundary layer composed of $Al_2O_{2.12}$ (p=0.88) was formed by sputtering an Al target in a mixed gas consisting of 15.6% of oxygen and 84.4% of argon. After overwriting 10,000 times, the jitters were measured and found to be 2.45 ns (7.2% of window width), being practically sufficiently small. The signal amplitude showed little change compared with the signal amplitude measured after overwriting 10 times, and bursting was not observed either. The optical recording medium was recorded once and the byte error rate at that time was measured and found to be $1.7 \times 10^{-6}$. The recorded optical recording medium was allowed to stand at 90° C. and 80% relative humidity for 70 hours. Then, the byte error rate of the same portion was measured and found to be $1.7 \times 10^{-6}$, showing no change at all. Furthermore, the same portion was overwritten once, and the byte error rate was found to be $1.8 \times 10^{-5}$, showing a little change. The jitters in this case were as good as 3.20 nm (9.4% of window width). It was also confirmed visually that interlayer separation did not occur.

EXAMPLE 42

A optical recording medium was produced as described for Example 36, except that a 2 nm first boundary layer composed of $Al_2O_{1.87}$ (p=1.13) was formed by sputtering an Al target in a mixed gas consisting of 14.9% of oxygen and 85.1% of argon. After overwriting 10,000 times, the jitters were measured and found to be 2.44 ns (7.2% of window width), being practically sufficiently small. The signal amplitude showed little change compared with the signal amplitude measured after overwriting 10 times, and bursting was not observed. The optical recording medium was recorded once and the byte error rate at that time was measured and found to be $3.3 \times 10^{-6}$. The recorded optical recording medium was allowed to stand at 90° C. and 80% relative humidity for 70 hours. Then, the byte error rate of the same portion was measured and found to be $3.3 \times 10^{-6}$, showing no change at all. Furthermore, the same portion was overwritten once, and the byte error rate was found to be $1.3 \times 10^{-5}$, showing a little change. The jitters in this case were as good as 3.3 nm (9.7% of window width). It was also confirmed visually that interlayer separation did not occur.

EXAMPLE 43

A optical recording medium was produced as described for Example 36, except that a 2 nm thick first boundary layer composed of $Al_2O_{1.28}$ (p=1.72) was formed by sputtering an Al target in a mixed gas consisting of 11.1% of oxygen and 88.9% of argon. After overwriting 10,000 times, the Jitters were measured and found to be 2.44 ns (7.1% of window width), being practically sufficiently small. The signal amplitude showed little change compared with the signal amplitude measured after overwriting 10 times, and bursting was not observed. The optical recording medium was recorded once and the byte error rate at that time was measured and found to be $1.0 \times 10^{-5}$. The recorded optical recording medium was allowed to stand at 90° C. and 80% relative humidity for 70 hours. Then, the byte error rate of the same portion was measured and found to be $1.0 \times 10^{-5}$, showing no change at all. Furthermore, the same portion was overwritten once, and the byte error rate was found to be $1.9 \times 10^{-5}$, showing a little change. The jitters in this case were as good as 3.31 nm (9.7% of window width). It was also confirmed visually that interlayer separation did not occur.

EXAMPLE 44

A optical recording medium was produced as described for Example 36, except that a 2 nm thick first boundary layer composed of $Al_2O_{0.81}$ (p=2.19) was formed by sputtering an Al target in a mixed gas consisting of 7.0% of oxygen and 93.0% of argon. After overwriting 10,000 times, the jitters were measured and found to be 3.14 ns (9.2% of window width), being practically sufficiently small. The signal amplitude showed little change compared with the signal amplitude measured after overwriting 10 times, but slight bursting was observed. The optical recording medium was recorded once and the byte error rate at that time was measured and found to be $6.6 \times 10^{-6}$. The recorded optical recording medium was allowed to stand at 90° C. and 80% relative humidity for 4 hours. Then, the byte error rate of the same portion was measured and found to be $6.6 \times 10^{-6}$, showing no change at all. It was also confirmed visually that interlayer separation did not occur.

EXAMPLE 45

A optical recording medium was produced as described for Example 36, except that a 2 nm thick first boundary layer composed of $Al_2O_{2.96}$ (p=0.04) was formed by sputtering an $Al_2O_3$ target in argon gas. After overwriting 10,000 times, the jitters were measured and found to be 3.00 ns (8.8% of window width), being practically sufficiently small. The signal amplitude showed little change compared with the signal amplitude measured after overwriting 10 times, and bursting was not observed either. The optical recording medium was recorded once and the byte error rate at that time was measured and found to be $6.0 \times 10^{-6}$. The recorded optical recording medium was allowed to stand at 80° C. and 80% relative humidity for 70 hours. Then, the byte error rate of the same portion was measured and found to be $3.0 \times 10^{-5}$, though some bursting was observed.

EXAMPLE 46

A polycarbonate substrate having a guide groove with a thickness of 0.6 mm, diameter of 12 cm and pitch of 1.48 μm (land width 0.74 μm and groove width 0.74 μm) was rotated at 30 rpm for sputtering as follows. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 93 nm thick first dielectric layer on the substrate. Then, an Al target was sputtered in a mixed gas consisting of 11.1% of oxygen and 88.9% of argon, to form a 2 nm thick first boundary layer composed of $Al_2O_{1.28}$ (x=1.72). In succession, an alloy target consisting of Ge, Sb and Te was sputtered to form a 19 nm thick recording layer composed of $Ge_{33.9}Sb_{15.6}Te_{50.5}$ [i.e., $\{(Ge_{0.5}Te_{0.5})_{0.710}(Sb_{0.4}Te_{0.6})_{0.290}\}_{0.955}Sb_{0.045}$]. Furthermore, an Al target was sputtered in a mixed gas consisting of 11.1% of oxygen and 88.9% of argon, to form a 2 nm thick second boundary layer composed of $Al_2O_{1.28}$ (x=1.72). In succession, a 13 nm thick second dielectric layer was formed by sputtering the same ZnS-$SiO_2$ as the first dielectric layer. On it, $Al_{97.5}Cr_{2.5}$ alloy was sputtered to form a 110 nm thick reflection layer. The obtained disc was taken out of the vacuum chamber, and spin-coated with an acrylic ultraviolet light setting resin (SD-101 produced by Dainippon Ink and Chemicals, Inc.) on the reflection layer, and it was hardened by irradiation with ultraviolet light, to form a 3 μm thick resin layer. Then, using a screen printing machine, a slow-acting ultraviolet light setting resin was applied and irradiated with ultraviolet light, and stuck onto another disc produced similarly, to obtain an optical recording medium of the present invention.

The optical recording medium was recorded once and the byte error rate at that time was measured and found to be $1.9 \times 10^{-5}$. The recorded optical recording medium was allowed to stand at 80° C. for 100 hours in the air not adjusted in humidity by humidification, etc. Then, the byte error rate of the same portion was measured and found to be $2.7 \times 10^{-5}$, showing little change. Furthermore, the same portion was overwritten once, and it could be confirmed that the byte error rate showed no practical problem, being $1.0 \times 10^{-4}$. The jitters in this case were as good as 3.3 ns (9.7% of window width).

EXAMPLE 47

A 6-layer optical recording medium was produced as described for Example 46, except that the recording layer was composed of $Ge_{34.1}Sb_{15.3}Te_{50.6}$ [i.e., $\{(Ge_{0.5}Te_{0.5})_{0.706}(Sb_{0.4}Te_{0.6})_{0.294}\}_{0.965}Sb_{0.035}$].

The optical recording medium was recorded once and the byte error rate at that time was measured and found to be $7.8 \times 10^{-5}$. The recorded optical recording medium was allowed to stand at 80° C. for 100 hours in the air not adjusted in humidity by humidification, etc. Then, the byte error rate of the same portion was measured and found to be $1.00 \times 10^{-4}$, showing little change. Furthermore, the same portion was overwritten once, and it could be confirmed that the byte error rate showed no practical problem, being $1.7 \times 10^{-4}$. The jitters in this case were as good as 3.3 ns (9.7% of window width).

EXAMPLE 48

A 6-layer optical recording medium was produced as described for Example 46, except that the recording layer was composed of $Ge_{36.2}Sb_{13.0}Te_{50.8}$ [i.e., $\{(Ge_{0.5}Te_{0.5})_{0.747}(Sb_{0.4}Te_{0.6})_{0.253}\}_{0.968}Sb_{0.032}$].

The optical recording medium was recorded once and the byte error rate at that time was measured and found to be $1.7 \times 10^{-4}$. The recorded optical recording medium was allowed to stand at 80° C. for 100 hours in the air not adjusted in humidity by humidification, etc. Then, the byte error rate of the same portion was measured and confirmed to be $3.1 \times 10^{-4}$, showing no practical problem. Furthermore, the same portion was overwritten once, and it was confirmed that the byte error rate showed no practical problem, being $4.14 \times 10^{-4}$. The jitters in this case were 3.8 ns (11.2% of window width).

EXAMPLE 49

A 6-layer optical recording medium was produced as described for Example 46, except that the recording layer was composed of $Ge_{39.6}Sb_{10.2}Te_{50.2}$ [i.e., $\{(Ge_{0.5}Te_{0.5})_{0.818}(Sb_{0.4}Te_{0.6})_{0.182}\}_{0.969}Sb_{0.031}$].

The optical recording medium was recorded once and the byte error rate at that time was measured and found to be $1.5 \times 10^{-3}$. The recorded optical recording medium was allowed to stand at 80° C. for 100 hours in the air not adjusted in humidity by humidification, etc. Then, the byte error rate of the same portion was measured and confirmed to be $1.8 \times 10^{-3}$. Furthermore, the same portion was overwritten once, and the byte error rate was $1.3 \times 10^{-3}$, showing that the error rate was not worsened after overwriting. The jitters in this case were 4.4 ns (12.9% of window width).

EXAMPLE 50

A 6-layer optical recording medium was produced as described for Example 46, except that the recording layer was composed of $Ge_{27.0}Sb_{20.0}Te_{53.0}$ [i.e., $\{(Ge_{0.5}Te_{0.5})_{0.555}(Sb_{0.4}Te_{0.6})_{0.445}\}_{0.973}Sb_{0.027}$].

The optical recording medium was recorded once and the byte error rate at that time was measured and found to be $3.5 \times 10^{-5}$. The recorded optical recording medium was allowed to stand at 80° C. for 100 hours in the air not adjusted in humidity by humidification, etc. Then, the byte error rate of the same portion was measured and found to be $4.1 \times 10^{-4}$, showing some rise. Furthermore, the same portion was overwritten once, and the byte error rate was $6.5 \times 10^{-5}$, showing that the error rate was not worsened after overwriting. The jitters in this case were 3.1 ns (9.1% of window width).

COMPARATIVE EXAMPLE 15

A 6-layer optical recording medium was produced as described for Example 46, except that the recording layer was composed of $Ge_2Sb_2Te_5$ [i.e., $(Ge_{0.5}Te_{0.5})_{0.444}(Sb_{0.4}Te_{0.6})_{0.556}$].

The optical recording medium was recorded once and the byte error rate at that time was measured and found to be $2.7 \times 10^{-5}$. The recorded optical recording medium was allowed to stand at 90° C. and 80% relative humidity for 140 hours. Then, the byte error rate of the same portion was attempted to be measured, but could not be measured because of deterioration. The reproduced waveform was observed, and it was found that the amplitude greatly decreased. It was estimated that the amorphous portion was partially crystallized.

Furthermore, even when the recording layer was composed of $Ge_1Sb_2Te_4$ [i.e., $(Ge_{0.5}Te_{0.5})_{0.286}(Sb_{0.4}Te_{0.6})_{0.714}$], the optical recording medium which was allowed to stand at 90°°C. and 80% relative humidity for 140 hours was greatly deteriorated in byte error rate from $5.3 \times 10^{-3}$ to a state not allowing measurement, to show that the archival property was insufficient.

COMPARATIVE EXAMPLE 16

A 6-layer optical recording medium was produced as described for Example 46, except that the recording layer was composed of $Ge_{0.5}Te_{0.5}$ [i.e., $\{(Ge_{0.5}Te_{0.5})_{1.00}(Sb_{0.4}Te_{0.6})_{0.00}\}_{1.00}Sb_{0.00}$].

The optical recording medium was recorded once, and the byte error rate was attempted to be measured but could not be measured. The reason was that the jitters were as high as 20%.

EXAMPLE 51

A polycarbonate substrate having a spiral groove with a thickness of 0.6 mm, diameter of 12 cm and pitch of 1.48 $\mu$m (land width 0.74 $\mu$m and groove width 0.74 $\mu$m) was rotated at 30 rpm for sputtering. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 92 nm thick first dielectric layer on the substrate. Then, a carbon target was sputtered in nitrogen gas, to form a 2 nm thick first boundary layer composed of carbon and nitrogen. In succession, an alloy target composed of Ge, Sb and Te was sputtered, to form a 19 nm thick recording layer composed of $Nb_{0.4}Ge_{17.0}Sb_{27.9}Te_{54.7}$. Furthermore, a 16 nm thick second dielectric layer was formed by sputtering the same ZnS-$SiO_2$ as the first dielectric layer. On it, Al-Hf-Pd alloy was sputtered to form a 120 $\mu$m thick reflection layer, for obtaining an optical recording medium of the present invention.

After overwriting 100,000 times, the jitters were measured and found to be 3.06 ns, being practically sufficiently as small as 9% of window width. The signal amplitude showed little change compared with the signal amplitude measured after overwriting 10 times, and bursting was not observed. The optical recording medium was recorded once and the byte error rate at that time was measured and found to be $2.5 \times 10^{-5}$. The recorded optical recording medium was allowed to stand in dry condition and at 80°°C. for 100 hours. Then, the byte error rate of the same portion was measured and found to be $3.0 \times 10^{-5}$, showing little change. Furthermore, the same portion was overwritten once, and the byte error rate was found to be $4.1 \times 10^{-5}$, showing little change. The jitters in this case were as good as 3.39 ns corresponding to 10% of window width.

EXAMPLE 52

An optical recording medium was produced as described for Example 51, except that Al-Cr alloy was used instead of Al-Hf-Pd alloy. The recording properties were same as described in Example 51.

EXAMPLE 53

An optical recording medium was produced as described for Example 51, except that the recording layer was composed of $Ge_{17.1}Sb_{28.0}Te_{54.9}$ [i.e., $\{(Ge_{0.5}Te_{0.5})_{0.351}(Sb_{0.4}Te_{0.6})_{0.649}\}_{0.968}Sb_{0.032}$]. The recording properties were almost same as described in Example 51.

EXAMPLE 54

An optical recording medium was produced as described for Example 51, except that a carbon target was sputtered in a mixed gas consisting of 90% of argon and 10% of oxygen instead of nitrogen gas, to form a first boundary layer composed of carbon and oxygen. After overwriting 100,000 times, the litters were measured and found to be 3.05 ns (9% of window width), being practically sufficiently small. The signal amplitude showed little change compared with the signal amplitude measured after overwriting 10 times, and bursting was not observed. The optical recording medium was recorded once and the byte error rate at that time was measured and found to be $1.0 \times 10^{-5}$. The recorded optical recording medium was allowed to stand at 80° C. and 80% relative humidity for 100 hours. Then, the byte error rate of the same portion was measured and found to be $1.0 \times 10^{-5}$, showing little change. Furthermore, the same portion was overwritten once, and the byte error rate was found to be $1.2 \times 10^{-5}$, showing little change. The jitters in this case were as good as 3.41 ns (10% of window width).

EXAMPLE 55

An optical recording medium was produced as described for Example 51, except that a carbon target was sputtered in a mixed gas consisting of 80% of Ar, 10% of nitrogen and 10% of oxygen instead of nitrogen gas, to form a first boundary layer consisting of carbon, nitrogen and oxygen.

After overwriting 100,000 times, the jitters were measured and found to be 3.23 ns (9.5% of window width), being practically sufficiently small. The signal amplitude showed little change compared with the signal amplitude measured after overwriting 10 times, and bursting was not observed. The optical recording medium was recorded once and the byte error rate at that time was measured and found to be $2.0 \times 10^{-5}$. The recorded optical recording medium was allowed to stand at 80° C. and 80% relative humidity for 100 hours. Then, the byte error rate of the same portion was measured and found to be $2.0 \times 10^{-5}$, showing little change. Furthermore, the same portion was overwritten once, and the byte error rate was found to be $2.1 \times 10^{-5}$, showing little change. The jitters in this case were as good as 3.33 ns (9.8% of window width).

EXAMPLE 56

A polycarbonate substrate having a spiral groove with a thickness of 0.6 mm, diameter of 12 cm and pitch of 1.48 $\mu$m (land width 0.74 $\mu$m and groove width 0.74 $\mu$m) was rotated at 30 rpm for sputtering. At first, a vacuum chamber was evacuated to $1 \times 10^{-3}$ Pa, and ZnS containing 20 mol % of $SiO_2$ was sputtered in $2 \times 10^{-1}$ Pa Ar gas atmosphere, to form a 92 nm thick first dielectric layer on the substrate. Then, a carbon target was sputtered in nitrogen gas, to form a 2 nm thick first boundary layer composed of carbon and nitrogen. In succession, an alloy target consisting of Ge, Sb and Te was sputtered, to form a 19 nm thick recording layer composed of $Nb_{0.4}Ge_{17.0}Sb_{27.9}Te_{54.7}$ [i.e., $\{(Ge_{0.5}Te_{0.5})_{0.351}(Sb_{0.4}Te_{0.6})_{0.649}\}_{0.968}Sb_{0.028}Nb_{0.004}$]. Again a carbon target was sputtered in nitrogen gas, to form a 2 nm thick second boundary layer consisting of carbon and nitrogen. Furthermore, a 14 nm thick second dielectric layer was formed by sputtering the same ZnS-$SiO_2$ as the first dielectric layer. On it, Al-Cr alloy was sputtered to form a 120 nm thick reflection layer, for obtaining an optical recording medium of the present invention.

After overwriting 100,000 times, the jitters were measured and found to be 3.07 ns (9% of window width), being practically sufficiently small. The signal amplitude showed little change compared with the signal amplitude measured after overwriting 10 times, and bursting was not observed.

The optical recording medium was recorded once and the byte error rate at that time was measured and found to be $2.4 \times 10^{-5}$. The recorded optical recording medium was allowed to stand at 80° C. and 80% relative humidity for 100 hours. Then, the byte error rate of the same portion was measured and found to be $2.9 \times 10^{-5}$, showing little change. Furthermore, the same portion was overwritten once, and the byte error rate was found to be $3.9 \times 10^{-5}$, showing little change. The Jitters in this case were as good as 3.37 ns corresponding to 9.9% of window width.

When a layer composed of carbon and oxygen or a layer composed of carbon, nitrogen and oxygen was used as the first boundary layer, the recording properties were almost the same.

EXAMPLE 57

An optical recording medium was obtained as described for Example 51, except that a carbon target was sputtered in a mixed gas consisting of 90% of argon and 10% of oxygen instead of nitrogen gas, to form a second boundary layer composed of carbon and oxygen. Measurement was effected as described for Example 51.

After overwriting 100,000 times, the jitters were measured and found to be 3.07 ns, being practically sufficiently as small as 9% of window width. The signal amplitude showed little change compared with the signal amplitude measured after overwriting 10 times, and bursting was not observed. The optical recording medium was recorded once and the byte error rate at that time was measured and found to be $2.6 \times 10^{-5}$. The recorded optical recording medium was allowed to stand at 80° C. and 80% relative humidity for 100 hours. Then, the byte error rate of the same portion was measured and found to be $2.8 \times 10^{-5}$, showing little change. Furthermore, the same portion was overwritten once, and the byte error rate was found to be $3.8 \times 10^{-5}$, showing little change. The jitters in this case were as good as 3.37 ns (9.9% of window width).

When a layer consisting of carbon and oxygen or a layer consisting of carbon, nitrogen and oxygen was used as the first boundary layer, the recording properties were almost the same.

EXAMPLE 58

An optical recording medium was obtained as described for Example 51, except that a carbon target was sputtered in a mixed gas consisting of 80% of argon, 10% of nitrogen and 10% of oxygen instead of nitrogen gas, to form a second boundary layer composed of carbon, nitrogen and oxygen. Measurement was effected as described for Example 51. After overwriting 100,000 times, the jitters were measured and found to be 3.06 ns (9% of window width), being practically sufficiently small. The signal amplitude showed little change compared with the signal amplitude measured after overwriting 10 times, and bursting was not observed.

The optical recording medium was recorded once and the byte error rate at that time was measured and found to be $2.3 \times 10^{-5}$. The recorded optical recording medium was allowed to stand at 80° C. and 80% relative humidity for 100 hours. Then, the byte error rate of the same portion was measured and found to be $2.4 \times 10^{-5}$, showing little change. Furthermore, the same portion was overwritten once, and the byte error rate was found to be $3.3 \times 10^{-5}$, showing little change. The jitters in this case were as good as 3.33 ns corresponding to 9.8% of window width.

When a layer composed of carbon and oxygen or a layer composed of carbon, nitrogen and oxygen was used as the first boundary layer, the recording properties were almost the same.

EXAMPLE 59

An optical recording medium was obtained as described for Example 51, except that a carbon target was sputtered in argon gas instead of nitrogen gas, to form a second boundary layer comp osed of carbon. Measurement was effected as described for Example 51.

After overwriting 100,000 times, the jitters were measured and found to be 3.06 ns (9% of window width), being practically sufficiently small. The signal amplitude showed little change compared with the signal amplitude measured after overwriting 10 times, and bursting was not observed. The optical recording medium was recorded once and the byte error rate at that time was measured and found to be 2. $1 \times 10^{-5}$. The recorded optical recording medium was allowed to stand at 80° C. and 80% relative humidity for 100 hours. Then, the byte error rate of the same portion was measured and found to be $2.2 \times 10^{-5}$, showing little change. Furthermore, the same portion was overwritten once, and the byte error rate was found to be $3.0 \times 10^{-5}$, showing little change. The jitters in this case were as good as 3.16 ns (9.3% of window width).

When a layer composed of carbon and oxygen or a layer composed of carbon, nitrogen and oxygen was used as the first boundary layer, the recording properties were almost the same.

COMPARATIVE EXAMPLE 17

An optical recording medium was produced as described for Example 51, except that the first boundary layer was not formed. Measurement was effected as described for Example 51. After overwriting 100,000 times, the jitters were as large as 4.76 nm (14%), and the signal amplitude was 70% of the signal amplitude measured after overwriting 10 times. to show a lower contrast.

The error rate after recording once was $4.0 \times 10^{-5}$. The optical recording medium was allowed to stand at 80° C. and 80% relative humidity for 100 hours as described for Example 51. Then, the byte error rate of the same portion was measured and found to be $3.0 \times 10^{-5}$, showing little change. However, when the same portion was overwritten once, it was found to be so deteriorated as not to allow measurement of byte error rate. The cause of the deterioration was that the jitters were as high as about 6.13 ns (18% of window width).

COMPARATIVE EXAMPLE 18

An optical recording medium was obtained as described for Example 51, except that the first boundary layer was not formed, and that a carbon target was sputtered at a pressure of 0.2 Pa in a mixed gas consisting of 95% of argon and 5% of oxygen, to form an 18 nm thick second dielectric layer composed of carbon and oxygen. Measurement was effected as described for Example 51. After overwriting 20,000 times, the signal amplitude was 80% of the signal amplitude measured after overwriting 10 times, to show a lower contrast. The optical recording medium was allowed to stand at 80° C. and 80% relative humidity for 100 hours, and it was observed that interlayer separation occurred in the optical recording medium.

EXAMPLE 60

A 6-layer optical recording medium was produced as described for Example 56, except that the recording layer was composed of $Ge_{33.9}Sb_{15.6}Te_{50.5}$ [i.e., $\{(Ge_{0.5}Te_{0.5})_{0.710}(Sb_{0.4}Te_{0.6})_{0.290}\}_{0.955}Sb_{0.045}$].

The optical recording medium was recorded once and the byte error rate at that time was measured and found to be $2.8\times10^{-5}$. The recorded. optical recording medium was allowed to stand at 80° C. for 100 hours in the air not adjusted in humidity by humidification, etc. Then, the byte error rate of the same portion was measured and found to be $4.5\times10^{-5}$, showing little change. Furthermore, the same portion was overwritten once, and it could be confirmed that the byte error rate showed no practical problem, being $1.8\times10^{-4}$. The Jitters in this case were as good as 3.5 ns (10.3% of window width).

EXAMPLE 61

A 6-layer optical recording medium was produced as described for Example 56, except that the recording layer was composed of $Ge_{34.1}Sb_{15.3}Te_{50.6}$ [i.e., $\{(Ge_{0.5}Te_{0.5})_{0.713}(Sb_{0.4}Te_{0.6})_{0.287}\}_{0.958}Sb_{0.042}$].

The optical recording medium was recorded once and the byte error rate at that time was measured and found to be $3.8\times10^{-5}$. The recorded optical recording medium was allowed to stand at 80° C. for 100 hours in the air not adjusted in humidity by humidification, etc. Then, the byte error rate of the same portion was measured and found to be $1.2\times10^{-4}$, showing little change. Furthermore, the same portion was overwritten once, and it could be confirmed that the byte error rate showed no practical problem, being $4.2\times10^{-4}$. The jitters in this case were as good as 3.6 ns (10.6% of window width).

EXAMPLE 62

A 6-layer optical recording medium was produced as described for Example 56, except that the recording layer was composed of $Ge_{36.2}Sb_{13.0}Te_{50.8}$ [i.e., $\{(Ge_{0.5}Te_{0.5})_{0.747}(Sb_{0.4}Te_{0.6})_{0.253}\}_{0.968}Sb0.032$].

The optical recording medium was recorded once and the byte error rate at that time was measured and found to be $2.5\times10^{-4}$. The recorded optical recording medium was allowed to stand at 80° C. for 100 hours in the air not adjusted in humidity by humidification, etc. Then, the byte error rate of the same portion was measured and found to be $3.2\times10^{-4}$, showing no practical problem. Furthermore, the same portion was overwritten once, and it could be confirmed that the byte error rate showed no practical problem, being $4.4\times10^{-4}$. The jitters in this case were as good as 3.9 ns (11.5% of window width).

EXAMPLE 63

A 6-layer optical recording medium was produced as described for Example 56, except that the recording layer was composed of $Ge_{39.6}Sb_{10.2}Te_{50.2}$ [i.e., $\{(Ge_{0.5}Te_{0.5})_{0.818}(Sb_{0.4}Te_{0.6})_{0.182}\}_{0.969}Sb_{0.031}$].

The optical recording medium was recorded once and the byte error rate at that time was measured and found to be $1.7\times10^{-3}$. The recorded optical recording medium was allowed to stand at 80° C. for 100 hours in the air not adjusted in humidity by humidification, etc. Then, the byte error rate of the same portion was measured and found to be $2.0\times10^{-3}$, showing little change. Furthermore, the same portion was overwritten once, and the byte error rate was $2.0\times10^{-3}$, showing that the error rate was not worsened after overwriting. The jitters in this case were 4.4 ns (12.9% of window width).

EXAMPLE 64

A 6-layer optical recording medium was produced as described for Example 56, except that the recording layer was composed of $Ge_{27.0}Sb_{20.0}Te_{53.0}$ [i.e., $\{(Ge_{0.5}Te_{0.5})_{0.555}(Sb_{0.4}Te_{0.6})_{0.445}\}_{0.973}Sb_{0.027}$].

The optical recording medium was recorded once and the byte error rate at that time was measured and found to be $3.7\times10^{-5}$. The recorded optical recording medium was allowed to stand at 80°°C. for 100 hours in the air not adjusted in humidity by humidification, etc. Then, the byte error rate of the same portion was measured and found to be $4.3\times10^{-4}$, showing some rise. Furthermore, the same portion was overwritten once, and the byte error rate was $7.1\times10^{-5}$, showing that the error rate was no worsened after overwriting. The jitters in this case were 3.1 ns (9.1% of window width).

COMPARATIVE EXAMPLE 19

A 6-layer optical recording medium was obtained as described for Example 56, except that the recording layer was composed of $Ge_2Sb_2Te_5$ [i.e., $(Ge_{0.5}Te_{0.5})_{0.444}(Sb_{0.4}Te_{0.6})_{0.556}$].

The optical recording medium was recorded once, and the byte error rate at that time was measured and found to be $3.1\times10^{-5}$. The recorded optical recording medium was allowed to stand at 90° C. and 80% relative humidity for 140 hours. Then, the byte error rate of the same portion was measured, but because of deterioration, the byte error rate could not be measured. The reproduced wavelength was observed, and it was found that the amplitude greatly decreased. It was estimated that the amorphous portion was partially crystallized.

Even when the recording layer was composed of $Ge_1Sb_2Te_4$ [i.e., $(Ge_{0.5}Te_{0.5})_{0.287}(Sb_{0.4}Te_{0.6})_{0.714}$], the optical recording medium which was allowed to stand at 90° C. and 80% relative humidity for 140 hours was greatly deteriorated in byte error rate from $5.9\times10^{-3}$ to a state not allowing measurement, to show that the archival property was insufficient.

COMPARATIVE EXAMPLE 20

A 6-layer optical recording medium was produced as described for Example 56, except that the recording layer was composed of $Ge_{0.5}Te_{0.5}$ [i.e., $\{(Ge_{0.5}Te_{0.5})_{1.00}(Sb_{0.4}Te_{0.6})_{0.00}\}_{1.00}Sb_{0.00}$].

The optical recording medium was recorded once, and the byte error rate at that time was attempted to be measured, but could not be measured. The reason was that the jitters were as high as 20%.

Industrial Applicability

The optical recording medium of the present invention can provide the following effects;
(1) Even if overwriting is repeated, jitters increase, contrast decline, bursting, etc. occur less.
(2) Even if the optical recording medium is allowed to stand for a long time after recording, good overwritability can be maintained.

(3) Even if the optical recording medium is allowed to stand for a long time after recording, bursting and vanishing of recorded marks do not occur.

The optical recording medium of the present invention is less deteriorated by repeated overwriting, and can be suitably used as a rewritable phase change type optical recording medium excellent in storage durability.

What is claimed is:

1. An optical recording medium comprising at least a first dielectric layer, a first boundary layer in contact with a recording layer, and the recording layer laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer comprises a material selected from the group consisting of:
(1) oxides of one or more elements (excluding carbon) belonging to group 3A through group 6B of the 2nd period through the 6th period in the periodic table,
(2) carbides of one or more elements selected from the group consisting of B, Al, Sc, Ti, V, Cr, Mn, Fe, Co, Ni, Cu, Zn, Ga, Ge, Y, Zr, Nb, Mo, Ru, Rh, Pd, Ag, Cd, In, Sn, La, Hf, Ta, W, Re, Ir, Tl and Pb,
(3) nitrides of one or more elements selected from the group consisting of B, Sc, V, Cr, Mn, Fe, Co, Ni, Cu, Zn, Ga, Y, Nb, Mo, Ru, Rh, Pd, Ag, Cd, In, Sn, La, Hf, Ta, W, Re, Ir, Tl and Pb, and
(4) carbon or compounds with carbon and oxygen and/or nitrogen, wherein said recording layer comprises the composition represented by the following formula (I):

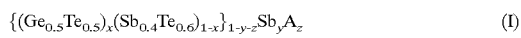

$$\{(Ge_{0.5}Te_{0.5})_x(Sb_{0.4}Te_{0.6})_{1-x}\}_{1-y-z}Sb_yA_z \qquad (I)$$

wherein A represents one selected from the elements belonging to group 3A through group 6B of the 2nd period through the 6th period in the periodic table, excluding Ge, Sb and Te, and x, y and z satisfy the following relations:
$0.2 \leq x \leq 0.8$, $0.01 \leq y \leq 0.08$, $z=0$, or
$0.2 \leq x \leq 0.8$, $0 \leq y \leq 0.08$, $0 < z \leq 0.2$.

2. An optical recording medium comprising at least a first dielectric layer, a first boundary layer in contact with a recording layer, the recording layer, and a second boundary layer in contact with the recording layer, laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer and said second boundary layer comprise a material selected from the group consisting of:
(1) oxides of one or more elements selected from the group consisting of B, Al, Sc, Ti, V, Cr, Mn, Fe, Co, Ni, Cu, Zn, Ga, Ge, Y, Zr, Nb, Mo, Ru, Rh, Pd, Ag, Cd, In, Sn, La, Hf, Ta, W, Re, Ir, Tl and Pb,
(2) carbides of elements (excluding carbon) belonging to group 3A through group 6B of the 2nd to the 6th period in the periodic table,
(3) nitrides of elements (excluding carbon) belonging to group 3A through group 6B of the 2nd period through the 6th period in the periodic table, and
(4) carbon or compounds with carbon and oxygen and/or nitrogen, and said recording layer comprises the composition represented by the following formula (I):

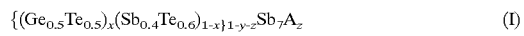

$$\{(Ge_{0.5}Te_{0.5})_x(Sb_{0.4}Te_{0.6})_{1-x}\}_{1-y-z}Sb_yA_z \qquad (I)$$

(where A represents one selected from the elements belonging to group 3A through group 6B of the 2nd period through the 6th period in the periodic table, excluding Ge, Sb and Te, and x, y and z satisfy the following relations:
$0.2 \leq x \leq 0.95$, $0.01 < y \leq 0.08$, $z=0$, or
$0.2 \leq x \leq 0.95$, $0 \leq y \leq 0.08$, $0 < z \leq 0.2$).

3. An optical recording medium, according to claim 1 or 2, wherein the elements belonging to group 3A through group 6B of the 2nd period through the 6th period in the periodic table are elements selected from aluminum, silicon, titanium, chromium, germanium and zirconium.

4. An optical recording medium, according to claim 3, wherein the first boundary layer and/or the second boundary layer comprises a material selected from the group consisting of carbon, aluminum oxide, silicon carbide, titanium nitride, chromium nitride and germanium nitride.

5. An optical recording medium, according to claim 4, wherein the first boundary layer and/or the second boundary layer comprises carbon.

6. An optical recording medium, according to claim 4, wherein the first boundary layer and/or the second boundary layer comprises aluminum oxide which is represented by

$$Al_2O_{3-p} \qquad (III)$$

$(0 < p \leq 2.0)$.

7. An optical recording medium, according to claim 4, wherein the first boundary layer and/or the second boundary layer comprises silicon carbide which is represented by

$$SiC_q \qquad (IV)$$

$(0.3 < q < 1)$.

8. An optical recording medium, according to claim 4, wherein the first boundary layer and/or the second boundary layer is mainly composed of titanium nitride which is represented by

$$TiN_r \qquad (V)$$

$(0.5 < r < 1)$.

9. An optical recording medium, according to claim 4, wherein the first boundary layer and/or the second boundary layer is mainly composed of chromium nitride which is represented by

$$CrN_s \qquad (VI)$$

$(0.8 < s < 1)$.

10. An optical recording medium, according to claim 4, wherein the first boundary layer and/or the second boundary layer is mainly composed of germanium nitride which is represented by

$$GeN_t \qquad (VII)$$

$(0.2 < t < 1)$.

11. An optical reading medium, according to claim 1 or 2, wherein the first boundary layer comprises carbon having a thickness of 0.5 nm to 4 nm.

12. An optical recording medium, according to claim 1 or 2, wherein the composition of the first boundary layer and/or the second boundary layer is not uniform, and the concentration of elements (excluding carbon) belonging to group 3A through group 6B of the 2nd period through the 6th period in the periodic table is higher at a position near to the recording layer.

13. An optical recording medium, according to claim 2, wherein the second boundary layer comprises carbon having a thickness of 0.5 nm to 4 nm.

14. An optical recording medium, according to claim 1 or 2, wherein the first boundary layer is mainly composed of carbon and its thickness is 0.5 nm to 4 nm.

15. An optical recording medium, according to claim 1 or 2, further comprising a reflection layer.

16. An optical recording medium, according to claim 2, wherein the second boundary layer is mainly composed of carbon, and its thickness is 0.5 nm to 4 nm.

17. An optiacl recording medium comprising at least a first dielectric layer, a first boundary layer comprising carbon in contact with a recording layer, the recording layer, and a second boundary layer in contact with the recording layer, laminated in this order on a substrate, wherein information can be recorded, erased and reproduced by irradating the recording layer with light, and the recording and erasure of information are effected by reversible phase change between the amorphous phase and the crystalline phase of the recording layer, and said first boundary layer and said second boundary layer comprise a material selected from the group consisting of:
(1) oxides of one or more elements (excluding carbon) belonging to a group 3A through group 6B of the 2nd period through the 6th period in the periodic table,
(2) carbides of one or more elements (excluding carbon) belonging to group 3A through group 6B of the 2nd to the 6th periodic table,
(3) nitrides of one or more elements (excluding carbon) belonging to group 3A through group 6B of the 2nd period through the 6th period in the periodic table, and
(4) carbon or compounds with carbon and oxygen and/or nitrogen, wherein said recording layer comprises the composition represented by the following formula (I):

$$\{(Ge_{0.5}Te_{0.5})_x(Sb_{0.4}Te_{0.6})_{1-x}\}_{1-y-z}Sb_yA_z \quad (I)$$

wherein A represents one selected from the elements belonging to group 3A through group 6B of the 2nd period through the 6th period in the periodic table, excluding Ge, Sb, and Te, and x, y and z satisfy the following relations:
$0.2 \leq x \leq 0.8$, $0.01 \leq y \leq 0.08$, $z=0$, or
$0.2 \leq x \leq 0.8$, $0 \leq y \leq 0.08$, $0<z \leq 0.2$.

18. An optical recording medium comprising at least a first dielectric layer, a first boundary layer in contact with a recording layer, and the recording layer laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer comprises a material selected from the group consisting of:
(1) oxides of one or more elements (excluding carbon) belonging to group 3A through group 6B of the 2nd period through the 6th period in the periodic table,
(2) carbides of one or more elements (excluding carbon) belonging to group 3A through group 6B of the 2nd to the 6th period in the periodic table,
(3) nitrides of one or more elements (excluding carbon) belonging to group 3A through group 6B of the 2nd period through the 6th period in the periodic table, and
(4) carbon or compounds with carbon and oxygen and/or nitrogen, wherein said recording layer comprises the composition represented by the following formula (I):

$$\{(Ge_{0.5}Te_{0.5})_x(Sb_{0.4}Te_{0.6})_{1-x}\}_{1-y-z}Sb_yA_z \quad (I)$$

wherein A represents one selected from the elements belonging to group 3A through group 6B of the 2nd period through the 6th period in the periodic table, excluding Ge, Sb, and Te, and x, y and z satisfy the following relations:
$0.2 \leq x \leq 0.8$, $0.01 \leq y \leq 0.08$, $z=0$, or
$0.2 \leq x \leq 0.8$, $0 \leq y \leq 0.08$, $0<z \leq 0.2$ wherein the first boundary layer and/or the second boundary layer comprises carbon.

19. An optical recording medium comprising at least a first dielectric layer, a first boundary layer in contact with a recording layer, the recording layer, and a second boundary layer in contact with the recording layer, laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer and said second boundary layer comprise a material selected from the group consisting of:
(1) oxides of one or more elements (excluding carbon) belonging to group 3A through group 6B of the 2nd period through the 6th period in the periodic table,
(2) carbides of one or more elements (excluding carbon) belonging to group 3A through group 6B of the 2nd to the 6th period in the periodic table,
(3) nitrides of one or elements (excluding carbon) belonging to group 3A through group 6B of the 2nd period through the 6th period in the periodic table, and
(4) carbon or compounds with carbon and oxygen and/or nitrogen, wherein said recording layer comprises the composition represented by the following formula (I):

$$\{(Ge_{0.5}Te_{0.5})_x(Sb_{0.4}Te_{0.6})_{1-x}\}_{1-y-z}Sb_yA_z \quad (I)$$

wherein A represents one selected from the elements belonging to group 3A through group 6B of the 2nd period through the 6th period in the periodic table, excluding Ge, Sb and Te, and x, y and z satisfy the following relations:
$0.2 \leq x \leq 0.8$, $0.01 \leq y \leq 0.08$, $z=0$, or $0.2 \leq x \leq 0.8$, $0 \leq y \leq 0.08$, $0 < z \leq 0.2$ wherein the first boundary layer or the second boundary layer comprises carbon and has a thickness of 0.5 to 40 nm.

20. An optical recording medium comprising at least a first dielectric layer, a first boundary layer in contact with a recording layer, and the recording layer laminated in this order on a substrate, wherein information can be recorded, erased and reproduced by irradiating the recording layer with light, and the recording and erasure of information are effected by reversible phase change between the amorphous phase and the crystalline phase of the recording layer, and said first boundary layer comprises a material selected from the group consisting of:
(1) oxides of one or more elements (excluding carbon) belonging to group 3A through group 6B of the 2nd period through the 6th period in the periodic table,
(2) carbides of one or more elements (excluding carbon) belonging to group 3A through group 6B of the 2nd to the 6th period in the periodic table,
(3) nitrides of one or more elements (excluding carbon) belonging to group 3A through group 6B of the 2nd to the 6the period in the periodic table, and
(4) carbon or compounds with carbon and oxygen and/or nitrogen, wherein said recording layer comprises the composition represented by the following formula (I):

$$\{(Ge_{0.5}Te_{0.5})_x(Sb_{0.4}Te_{0.6})_{1-x}\}_{1-y-z}Sb_yA_z \quad (I)$$

wherein A represents one selected from the elements belonging to a group 3A through group 6B of the 2nd period through the 6th period in the periodic table, excluding Ge, Sb and Te, and x, y and z satisfy the following relations:
$0.2 \leq x \leq 0.8$, $0.01 \leq y \leq 0.08$, $z=0$, or
$0.2 \leq x \leq 0.8$, $0 \leq y \leq 0.08$, $0 < z \leq 0.2$ wherein the first boundary layer or the second boundary layer comprises carbon and has a thickness of 0.5 to 40 nm.

* * * * *